(12) United States Patent
Soleymani et al.

(10) Patent No.: US 11,874,247 B2
(45) Date of Patent: Jan. 16, 2024

(54) PHOTOELECTROCHEMICAL BIOSENSOR AND METHODS OF USE THEREOF

(71) Applicant: McMaster University, Hamilton (CA)

(72) Inventors: Leyla Soleymani, Oakville (CA); Sudip Saha, Hamilton (CA); Amanda Victorious, Oakville (CA)

(73) Assignee: McMaster University, Hamilton (CA)

( * ) Notice: Subject to any disclaimer, the term of this patent is extended or adjusted under 35 U.S.C. 154(b) by 0 days.

(21) Appl. No.: 17/466,354

(22) Filed: Sep. 3, 2021

(65) Prior Publication Data

US 2022/0065806 A1    Mar. 3, 2022

Related U.S. Application Data

(60) Provisional application No. 63/074,086, filed on Sep. 3, 2020.

(51) Int. Cl.
*G01N 27/30* (2006.01)
*G01N 27/327* (2006.01)

(52) U.S. Cl.
CPC ....... *G01N 27/305* (2013.01); *G01N 27/3276* (2013.01)

(58) Field of Classification Search
CPC .................. G01N 27/305; G01N 27/3276
See application file for complete search history.

(56) References Cited

U.S. PATENT DOCUMENTS

2009/0294305 A1*  12/2009  Bekki ................ G01N 33/5438
                                                       205/792

FOREIGN PATENT DOCUMENTS

CN       109781818 A  *  5/2019
CN       111272848 A  *  6/2020  ......... G01N 27/3278
WO  WO-2018094779 A1  *  5/2018  ......... G01N 27/4145

OTHER PUBLICATIONS

Saha et al., Enhancing the Photoelectrochemical Response of DNA Biosensors Using Wrinkled Interfaces, ACS Appl. Mater. Interfaces 2018, 10, 31178-31185 (Year: 2018).*

(Continued)

*Primary Examiner* — Joshua L Allen
*Assistant Examiner* — Shizhi Qian
(74) *Attorney, Agent, or Firm* — Melanie Szweras; Herman Cheung; BERESKIN & PARR LLP/ S.E.N.C.R.L., s.r.l.

(57) ABSTRACT

Provided herein is a biosensor for detecting a target analyte in a sample comprising a first and second photoelectrode each comprising conductive substrate and photoactive material, a first and second capture probe functionalized on the first and second photoelectrode, respectively, and optionally one or more reporter moieties comprising a detectable label, wherein the first and second capture probe each, independently, provides a distance between the detectable label and the photoactive material in the presence of the target analyte, wherein intensity of detection signal dictated by the distance is generated from the first and second photoelectrode by transfer of electrons between the detectable label and the photoactive material, wherein a higher, or higher increase than in absence of sample, in the intensity of the detection signal from the first as compared to the second photoelectrode in the presence of the sample, is indicative of the presence of the target analyte.

16 Claims, 18 Drawing Sheets

Specification includes a Sequence Listing.

(56) References Cited

OTHER PUBLICATIONS

Zhao et al., Exciton-Plasmon Interactions between CdS Quantum Dots and Ag Nanoparticles in Photoelectrochemical System and Its Biosensing Application, Anal. Chem. 2012, 84, 14, 5892-5897 (Year: 2012).*

Qiu et al., Dual-Channel Photoelectrochemical Ratiometric Aptasensor with up-Converting Nanocrystals Using Spatial-Resolved Technique on Homemade 3D Printed Device, Anal. Chem. 2019, 91, 2, 1260-1268 (Year: 2019).*

Loiseau et al., Silver-based plasmonic nanoparticles for and their use in biosensing, Biosensors, 2019, 9(2):78 (Year: 2019).*

Bas et al., Photoelectrochemical competitive DNA hybridization assay using semiconductor quantum dot conjugated oligonucleotides, Anal. Bioanal. Chem., 2011, 400, 703-707 (Year: 2011).*

Victorious et al., Integrating TiO2 nanoparticles within a catecholic polymeric network enhances the photoelectrochemical response of biosensors, J. Phys. Chem. C, 2019, 123, 16186-16193 (Year: 2019).*

Zhao et al., Energy transfer between CdS quantum dots and Au nanoparticles in photoelectrochemical detection, Chem. Commun., 2011, 47, 10990-10992 (Year: 2011).*

Hao et al., Design of a dual channel self-reference photoelectrochemical biosensor, Analytical Chemistry, 2017, 89, 10133-10136 (Year: 2017).*

Voccia et al., Photoelectrochemical biosensor for nucleic acid detection, Journal of Nanoscience and Nanotechnology, 2015, 15, 3320-3332 (Year: 2015).*

Zhao et al., photoelectrochemical DNA biosensors, Chemical Reviews, 2014, 114, 7421-7441 (Year: 2014).*

Victorious et al. Integrating TiO2 Nanoparticles within a Catecholic Polymeric Network Enhances the Photoelectrochemical Response of Biosensors. The Journal of Physical Chemistry, vol. 123 (26), published Jun. 20, 2019, pp. 16186-16193.

Pinchuk et al. Influence of interband electronic transitions on the optical absorption in metallic nanoparticles. Journal of Physics D: Applied Physics, vol. 37 (22), published Oct. 28, 2004, pp. 3133-3139.

Halawa et al. Inositol directed facile "green" synthesis of fluorescent gold nanoclusters as selective and sensitive detecting probes of ferric ions. Sensors and Actuators B: Chemical, vol. 257, published Mar. 2018, pp. 980-987.

Li et al. Distinguishing surface effects of gold nanoparticles from plasmonic effect on photoelectrochemical water splitting by hematite. Journal of Materials Research, vol. 31 (11), published Jun. 14, 2016, pp. 1608-1615.

Wu. Plasmonic metal-semiconductor photocatalysts and photoelectrochemical cells: a review. Nanoscale, vol. 10 (6), published Jan. 2, 2018, pp. 2679-2696.

Cushing et al. Controlling Plasmon-Induced Resonance Energy Transfer and Hot Electron Injection Processes in Metal@TiO2 Core-Shell Nanoparticles. The Journal of Physical Chemistry C, vol. 119, published Jun. 18, 2015, pp. 16239-16244.

Meng et al. Enhancement of Solar Hydrogen Generation by Synergistic Interaction of La2Ti2O7 Photocatalyst with Plasmonic Gold Nanoparticles and Reduced Graphene Oxide Nanosheets. ACS Catalysis, vol. 5 (3), published Feb. 12, 2015, pp. 1949-1955.

Naphade et al. Plasmonic light harvesting of dye sensitized solar cells by Au-nanoparticle loaded TiO2 nanofibers. Journal of Materials Chemistry A, vol. 2 (4), published Oct. 30, 2013, pp. 975-984.

Lim et al. Facile synthesis of Au@TiO2 nanocomposite and its application as a photoanode in dye-sensitized solar cells. RSC Advances, vol. 5 (55), published May 18, 2015, p. 44398-44407.

Nbelayim et al. Systematic characterization of the effect of Ag@TiO2 nanoparticles on the performance of plasmonic dye-sensitized solar cells. Scientific Reports, vol. 7 (1), 15690, published online Nov. 16, 2017, pp. 1-12.

Lim et al. Boosting Photovoltaic Performance of Dye-Sensitized Solar Cells Using Silver Nanoparticle-Decorated N,S-Co-Doped-TiO2 Photoanode. Scientific Reports, vol. 5, 11922, published Jul. 6, 2015, pp. 1-14.

Wen et al. Effects of silver particles on the photovoltaic properties of dye-sensitized TiO2 thin films. Solar Energy Materials & Solar Cells, vol. 61 (4), published Apr. 1, 2000, pp. 339-351.

Hartland et al. What's so Hot about Electrons in Metal Nanoparticles? ACS Energy Letters, vol. 2 (7), published Jun. 9, 2017, pp. 1641-1653.

Govorov et al. Theory of Photoinjection of Hot Plasmonic Carriers from Metal Nanostructures into Semiconductors and Surface Molecules. The Journal of Physical Chemistry C, vol. 117 (32), published Jul. 11, 2013, pp. 16616-16631.

Besteiro et al. Understanding Hot-Electron Generation and Plasmon Relaxation in Metal Nanocrystals: Quantum and Classical Mechanisms. ACS Photonics, vol. 4 (11), published Sep. 12, 2017, pp. 2759-2781.

Minutella et al. Excitation-Dependence of Plasmon-Induced Hot Electrons in Gold Nanoparticles. The Journal of Physical Chemistry Letters, vol. 8 (19), published Sep. 25, 2017, pp. 4925-4929.

Zhao et al. A Comparison of Photocatalytic Activities of Gold Nanoparticles Following Plasmonic and Interband Excitation and a Strategy for Harnessing Interband Hot Carriers for Solution Phase Photocatalysis. ACS Central Science, vol. 3 (5), published May 15, 2017, pp. 482-488.

Guo et al. Efficient Base-Free Direct Oxidation of Glucose to Gluconic Acid over TiO2-Supported Gold Clusters. Accepted Manuscript, Nanoscale, vol. 11, published Dec. 19, 2018, pp. 1-10.

Tian and Tatsuma. Mechanisms and Applications of Plasmon-Induced Charge Separation at TiO2 Films Loaded with Gold Nanoparticles. Journal of the American Chemical Society, vol. 127 (20), published Apr. 29, 2005, pp. 7632-7637.

Zhang et al. Ag nanoclusters could efficiently quench the photoresponse of CdS quantum dots for novel energy transfer-based photoelectrochemical bioanalysis. Biosensors and Bioelectronics, vol. 85, published online Jun. 8, 2016, pp. 930-934.

Shu et al. Plasmonic Enhancement Coupling with Defect-Engineered TiO2-x: A Mode for Sensitive Photoelectrochemical Biosensing. Analytical Chemistry, vol. 90 (4), published Feb. 5, 2018, pp. 2425-2429.

Shi et al. Energy Transfer between Semiconducting Polymer Dots and Gold Nanoparticles in a Photoelectrochemical System: A Case Application for Cathodic Bioanalysis. Analytical Chemistry, vol. 90 (7), published Mar. 12, 2018, pp. 4277-4281.

Bettazzi et al. Ascorbic acid-sensitized Au nanorods-functionalized nanostructured TiO2 transparent electrodes for photoelectrochemical genosensing. Electrochimica Acta, vol. 276, published Jun. 20, 2018, pp. 389-398.

Chandrasekharan and Kamat. Improving the Photoelectrochemical Performance of Nanostructured TiO2 Films by Adsorption of Gold Nanoparticles. The Journal of Physical Chemistry B, vol. 104, published Sep. 7, 2000, pp. 10851-10857.

Lee et al. Highly Sensitive and Selective Colorimetric Sensors for Uranyl (UO22+): Development and Comparison of Labeled and Label-Free DNAzyme-Gold Nanoparticle Systems. Journal of the American Chemical Society, vol. 130, published Oct. 7, 2008, pp. 14217-14226.

Cushing and Wu. Plasmon-Enhanced Solar Energy Harvesting. The Electrochemical Society Interface, vol. 22, published Jan. 2013, pp. 63-67.

Pinchuk et al. Optical properties of metallic nanoparticles: influence of interface effects and interband transitions. Surface Science, vol. 557, published May 20, 2004, pp. 269-280.

Gomes Silva et al. Influence of Excitation Wavelength (UV or Visible Light) on the Photocatalytic Activity of Titania Containing Gold Nanoparticles for the Generation of Hydrogen or Oxygen from Water. Journal of the American Chemical Society, vol. 133, published Dec. 13, 2010, pp. 595-602.

Gelderman et al. Flat-Band Potential of a Semiconductor: Using the Mott-Schottky Equation. Journal of Chemical ducation, vol. 84, published Apr. 4, 2007, pp. 685-688.

(56) References Cited

OTHER PUBLICATIONS

Zhang et al. A gold nanoparticle-based chronocoulometric DNA sensor for amplified detection of DNA. Nature Protocols, vol. 2, published online Nov. 8, 2007, pp. 2888-2895.

Sundah et al. Barcoded DNA nanostructures for the multiplexed profiling of subcellular protein distribution. Nature Biomedical Engineering, vol. 3, published Sep. 2019, pp. 684-694.

Choi et al. Know Thy Nano Neighbor. Plasmonic versus Electron Charging Effects of Metal Nanoparticles in Dye-Sensitized Solar Cells. ACS Nano, vol. 6, published Apr. 11, 2012, pp. 4418-4427.

Li et al. Solar Hydrogen Generation by a CdSAu—TiO2 Sandwich Nanorod Array Enhanced with Au Nanoparticle as Electron Relay and Plasmonic Photosensitizer. Journal of the American Chemical Society, vol. 136, published May 16, 2014, pp. 8438-8449.

White and Catchpole. Plasmon-enhanced internal photoemission for photovoltaics: Theoretical efficiency limits. Applied Physics Letters, vol. 101, 073905, published online Aug. 17, 2012, pp. 1-4.

Rivetti et al. Polymer Chain Statistics and Conformational Analysis of DNA Molecules with Bends or Sections of Different Flexibility. Journal of Molecular Biology, vol. 280, published Jul. 3, 1998, pp. 41-59.

Anne and Demaille. Electron Transport by Molecular Motion of Redox-DNA Strands: Unexpectedly Slow Rotational Dynamics of 20-Mer Ds-DNA Chains End-Grafted onto Surfaces via C6 Linkers. Journal of the American Chemical Society, vol. 130, published Jul. 2, 2008, pp. 9812-9823.

Li et al. Gold Nanoparticles Decorated Hematite Photoelectrode for Sensitive and Selective Photoelectrochemical Aptasensing of Lysozyme. Analytical Chemistry, vol. 90, published Dec. 6, 2017, pp. 961-967.

Xu et al. Understanding the Enhancement Mechanisms of Surface Plasmon-Mediated Photoelectrochemical Electrodes: A Case Study on Au Nanoparticle Decorated TiO2 Nanotubes. Advanced Material Interfaces, vol. 2, 1500169, published Sep. 7, 2015, pp. 1-8.

Pu et al. Au Nanostructure-Decorated TiO2 Nanowires Exhibiting Photoactivity Across Entire UV-Visible Region for Photoelectrochemical Water Splitting. Nano Letters, vol. 13, published Jul. 30, 2013, pp. 3817-3823.

Zheng et al. Universal Ratiometric Photoelectrochemical Bioassay with Target-Nucleotide Transduction-Amplification and Electron-Transfer Tunneling Distance Regulation Strategies for Ultrasensitive Determination of MicroRNA in Cells. Analytical Chemistry, vol. 89, published Jul. 27, 2017, pp. 9445-9451.

Zhao et al. Recent advances in the use of quantum dots for photoelectrochemical bioanalysis. Nanoscale, vol. 8 (40), First published Aug. 11, 2016, pp. 17407-17414.

* cited by examiner

10

PHOTOELECTROCHEMICAL BIOSENSOR AND METHODS OF USE THEREOF

RELATED APPLICATION

This disclosure claims benefit of U.S. Provisional Patent Application Ser. No. 63/074,086 filed Sep. 3, 2020, incorporated herein by reference in its entirety.

INCORPORATION OF SEQUENCE LISTING

A computer readable form of the Sequence Listing "P62639US01_ST25_Sequence_Listing" (1,401 bytes), submitted via EFS-WEB and created on Aug. 31, 2021, is herein incorporated by reference.

FIELD

The present disclosure relates to the field of biosensors and, in particular, to, photoelectrochemical biosensors and methods of use thereof.

BACKGROUND

Biosensors combine biorecognition with signal transduction to analyze biologically relevant targets. Dynamic biorecognition agents such as structure switching aptamers and DNAzymes are increasingly used in biosensing due to their compatibility with real-time monitoring, ability to target difficult-to-capture analytes such as small molecules, and facile conjugation with reporting probes. Optical readout, based on fluorophore/quencher interactions, is currently the most widely used method for transducing these biorecognition events into detectable signals. There is a growing interest in combining these biorecognition systems with electrochemical readout due to the enhanced signal-to-noise ratio offered by electrochemical transducers, ease of multiplexing, and their applicability to continuous and in situ monitoring. For this purpose, redox species are integrated into dynamic biorecognition systems to translate the presence and concentration of analytes into a change in electrochemical signal. The challenge in using redox species with dynamic biorecognition agents including structure switching molecular probes is two-fold: it is challenging to design the molecular probe to demonstrate programmable signaling capabilities, such as tunability between signal-on and signal-off response and it is extremely difficult to find redox species that are stable and robust under complex biological or environmental conditions having varying oxygen levels, temperature, and pH.

Photoelectrochemical (PEC) readout offers a pathway towards this goal as it offers the simplicity and scalability of electrochemical readout with additional versatility in terms of the choice of readout labels as it is possible to exploit a wide range of photoactive semiconductors and plasmonic metals. PEC assays that use metallic nanoparticles (NPs) in conjunction with semiconducting photoactive materials build on the foundation that when metallic NPs are in direct contact or close proximity (~10 nm) with semiconducting materials having the desired energy level, the carrier lifetime increases or decreases, which modulates the photoelectrochemical current. Although it has been previously shown that electrochemical signaling is possible using PEC readout, the handful of previously reported assays require multiple labels that are activated under different potentials or wavelengths adding to the assay complexity.

The background herein is included solely to explain the context of the disclosure. This is not to be taken as an admission that any of the material referred to was published, known, or part of the common general knowledge as of the priority date.

SUMMARY

This disclosure describes a biosensor with programmable photoelectrochemical signaling, including for example with both signal-on and signal-off capabilities, using, for example, a single robust and stable label. Nanoscopic interactions between metallic nanoparticle (NPs) and semiconductor electrodes were utilized with photoelectrochemical (PEC) readout.

According to an aspect of the disclosure, provided herein is a biosensor for detecting a target analyte in a sample comprising:

- a first photoelectrode comprising a conductive substrate and a photoactive material; a second photoelectrode comprising a conductive substrate and a photoactive material;
- a first capture probe functionalized on the first photoelectrode;
- a second capture probe functionalized on the second photoelectrode; and
- optionally one or more reporter moieties comprising a detectable label;
- wherein the first capture probe and the second capture probe each, independently, provides a distance between the detectable label and the photoactive material in the presence of the target analyte,
- wherein intensity of detection signal dictated by the distance is generated from the first photoelectrode and the second photoelectrode by transfer of electrons between the detectable label and the photoactive material, and
- wherein a higher intensity of the detection signal from the first photoelectrode as compared to the second photoelectrode in the presence of the sample, or a higher increase in the intensity of the detection signal from the first photoelectrode as compared to the second photoelectrode in the presence of the sample as compared to in the absence of the sample, is indicative of the presence of the target analyte.

In some embodiments, the target analyte is a nucleic acid, wherein the first capture probe is capable of binding to a portion of the target analyte by complementarity, the second capture probe is capable of binding to a portion the target analyte by complementarity, and the reporter moiety is capable of binding to a portion of the target analyte by complementarity, and wherein the portion of the target analyte that can bind to the first capture probe or the second capture probe is a different portion than can bind to the reporter moiety.

In some embodiments, the reporter moiety is capable of binding to and being activated by the target analyte, wherein the activation of the reporter moiety releases a fragment comprising the detectable label whereby the fragment is capable of binding to the first capture probe and the second capture probe.

In some embodiments, the first capture probe comprises a first reporter moiety and the second capture probe comprises a second reporter moiety, wherein the first capture probe is capable of binding to the target analyte and the second capture probe is capable of binding to the target analyte, wherein upon binding of the target analyte to the first capture probe, the first reporter moiety comprising the detectable label is retained in the first capture probe, and wherein upon binding of the target analyte to the second capture probe, the second reporter moiety comprising the detectable label is released from the second capture probe.

In some embodiments, the detection signal is a change in photoelectrochemical current, voltage or impedance. In some embodiments, the detection signal is a change in photoelectrochemical current. Differential signal changes are calculated by adding the magnitude of detection signal changes. In some embodiments, the first photoelectrode is configured to provide an increase in the intensity of the detection signal and the second photoelectrode is configured to provide a decrease in the intensity of the detection signal in the presence of the target analyte as compared to in the absence of the target analyte. In some embodiments, binding of the target analyte to the first capture probe brings the detectable label closer to the photoactive material of the first photoelectrode than binding of the target analyte to the second capture probe of the second photoelectrode in bringing the detectable label to the photoactive material of the second photoelectrode. In some embodiments, the first capture probe comprises a first nucleic acid and the second capture probe comprises a second nucleic acid. In some embodiments, each of the first nucleic acid and the second nucleic acid is a single-stranded DNA, a DNAzyme, or an aptamer. In some embodiments, the target analyte is a nucleic acid, a carbohydrate, a lipid, a peptide, a protein, a small inorganic molecule, a small organic molecule, a metal ion, a, toxin, a cell, a tissue, a microorganism, or a virus.

In some embodiments, the conductive substrate comprises a conductive material, and optionally a non-conductive material. In some embodiments, the conductive material is selected from the group consisting of indium tin oxide (ITO), fluorine-doped tin oxide (FTO), antimony-doped tin oxide (ATO), aluminum-doped zinc oxide (AZO), gallium-doped zinc oxide (GZO), indium-doped zinc oxide (IZO) and a combination thereof. In some embodiments, the conductive material comprises indium tin oxide. In some embodiments, the non-conductive material is glass or polymer. In some embodiments, the polymer is selected from the group consisting of polyethylene terephthalate (PET), polyethylene naphthalate (PEN), polyimide (PI), and a combination thereof. In some embodiments, the photoactive material comprises thin film, photoactive particle, nanoparticle, microparticle, nanomaterial, nanowire, nanorods, nanostar, semiconductor material, metal, metal oxide, sulfide, metal chalcogenide, carbon-based material, conductive polymer, photoactive polymer, plasmonic material, dye, or a combination thereof. In some embodiments, the metal oxide is selected from the group consisting of Cd, Zn, In, Pb, Mo, W, Sb, Bi, Cu, Hg, Ti, Ag, Mn, Fe, V, Sn, Zr, Sr, Ga, Si, Cr, a perovskite, and a combination thereof. In some embodiments, the detectable label comprises plasmonic nanoparticle, organic dye, light absorbing molecule, semiconductive nanoparticle, a carbon-based nanomaterial, metal semiconductive quantum dot, or organic semiconductor. In some embodiments, the photoactive material comprises titanium dioxide and the detectable label comprises a gold nanoparticle.

Also provided is a method of detecting a target analyte in a sample, the method comprising:

contacting the sample with the biosensor as described herein under conditions for
i) binding the target analyte to the first capture probe and the second capture probe, and binding the target analyte to the reporter moiety,
ii) binding the target analyte to the reporter moiety, or
iii) binding the target analyte to the first capture probe and the second capture probe, measuring a detection signal from each of the first electrode and the second photoelectrode, whereby in a) i) upon binding the target analyte to the reporter moiety and to the first capture probe, a detection signal is generated by transfer of electrons between the detectable label and the photoactive material on the first photoelectrode, and upon binding the target analyte to the reporter moiety and the second capture probe, a detection signal is generated by transfer of electrons between the detectable label and the photoactive material on the second photoelectrode, wherein the target analyte is a nucleic acid, wherein the first capture probe is capable of binding to a portion of the target analyte by complementarity, the second capture probe is capable of binding to a portion the target analyte by complementarity, and the reporter moiety is capable of binding to a portion of the target analyte by complementarity, and wherein the portion of the target analyte that can bind to the first capture probe or the second capture probe is a different portion than can bind to the reporter moiety, or in a) ii) upon binding the target analyte to the reporter moiety, the reporter moiety is activated and a fragment of the reporter moiety comprising the detectable label is released, and the released fragment then binds to the first capture probe and the second capture probe, or in a) iii) upon binding the target analyte to the first capture probe comprising a first reporter moiety, the first reporter moiety comprising the detectable label is retained in the first capture probe, and upon binding of the target analyte to the second capture probe comprising a second reporter moiety, the second reporter moiety comprising the detectable label is released from the second capture probe, wherein a higher intensity of the detection signal from the first photoelectrode as compared to the second photoelectrode in the presence of the sample, or a higher increase in the intensity of the detection signal from the first photoelectrode as compared to the second photoelectrode in the presence of the sample as compared to in the absence of the sample, is indicative of the presence of the target analyte.

In some embodiments, the detection signal is a change in photoelectrochemical current.

Other features and advantages of the present disclosure will become apparent from the following detailed description. It should be understood, however, that the detailed description and the specific examples, while indicating embodiments of the disclosure, are given by way of illustration only and the scope of the claims should not be limited by these embodiments, but should be given the broadest interpretation consistent with the description as a whole.

DRAWINGS

Certain embodiments of the disclosure will now be described in greater detail with reference to the attached drawings in which:

FIG. 1A shows channels are created by depositing 15-mer or 20-mer probe DNA nano-spacers on photoactive $TiO_2$ substrates and Au NP-labelled 25-mer targets are hybridized onto the two channels.

FIG. 1B shows SEM image of the electrode before (i) and after (ii) DNA hybridization with Au NP-labelled DNA target; the insets show the magnified image of the substrate acquired using the backscatter detector, with the arrow pointing to Au NPs (scale bar in the inset represents 100 nm).

Figure 2A:
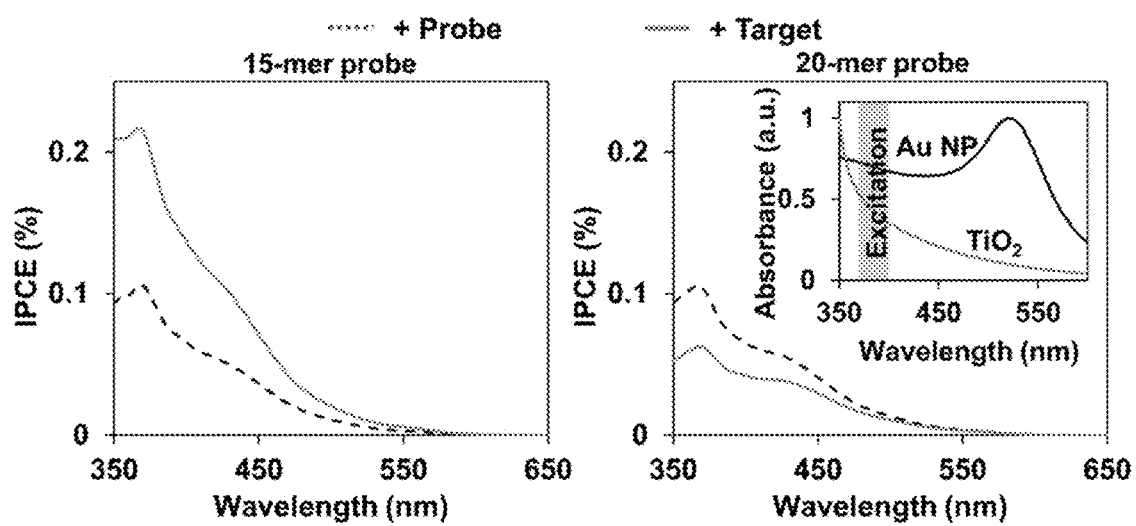

FIG. 2A shows photoelectrochemical characterization of two sensing channels in an exemplary embodiment of the disclosure. FIG. 2A shows incident photon to current conversion efficiency (IPCE) spectrum of the photoactive electrode after probe attachment and after hybridization with Au NP-labelled complementary DNA targets (inset shows the absorption spectrum of Au NPs and $TiO_2$ NPs and the spectral range of the light source).

Figure 2B:
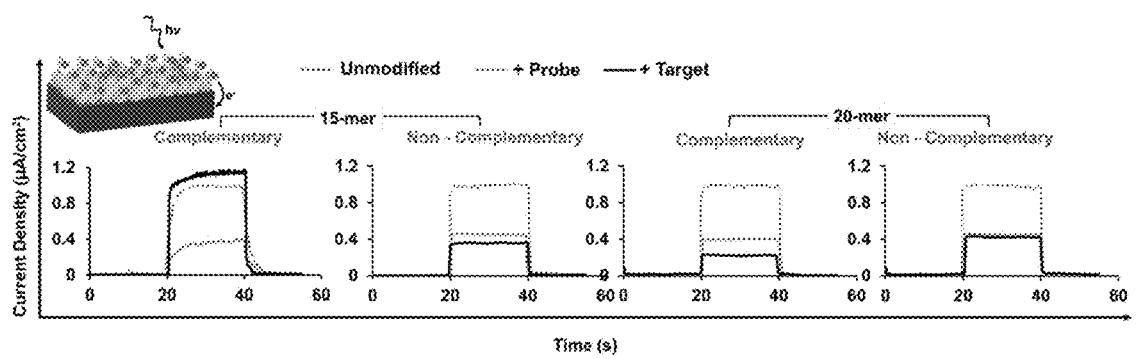

FIG. 2B shows photoelectrochemical characterization of two sensing channels in an exemplary embodiment of the disclosure. FIG. 2B shows representative PEC curves of the photoelectrode obtained using chopped light chronoamperometry at 0 V bias versus Ag/AgCl, before modification, following modification with 15-mer or 20-mer probe, and after hybridization with a 25-mer complementary or non-complementary Au NP-labelled target (photoelectrodes were illuminated at 395 nm for 20 s starting at 20 s—light on—and ending at 40 s—light off—with 0.1 M ascorbic acid in 0.1 M phosphate buffered solution used as the supporting electrolyte); inset schematically demonstrates photoelectrochemical readout.

Figure 2C:
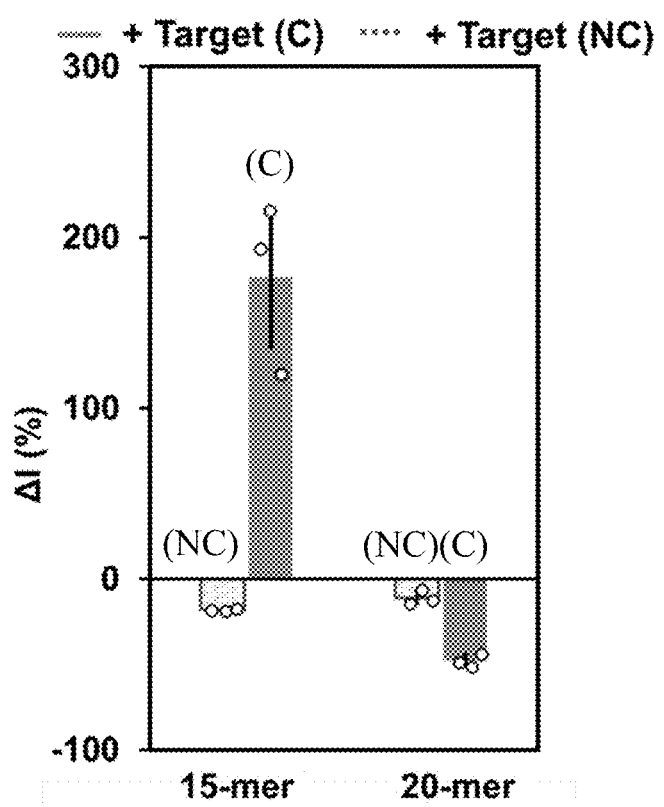

FIG. 2C shows photoelectrochemical characterization of two sensing channels in an exemplary embodiment of the disclosure. FIG. 2C shows bar plots summarizing the percentage change in photocurrents following hybridization of 15-mer and 20-mer channels with Au NP-labelled complementary (C) and non-complementary (NC) targets (error bars represent standard deviation, with experiments performed using at least three separate devices).

Figure 3:
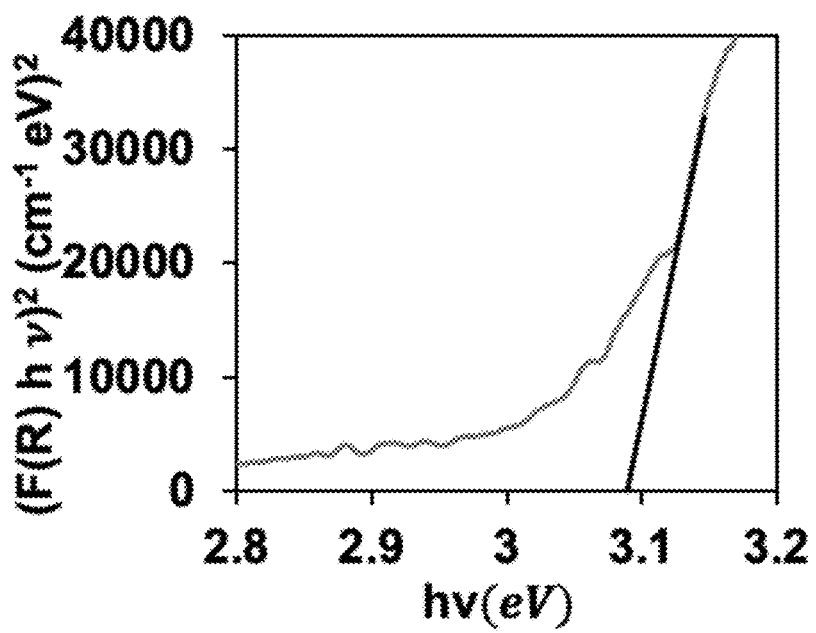

FIG. 3 shows determination of the bandgap of the $TiO_2$ NP films using the intersection of the slope and x-axis by plotting $(F(R)h\nu)^n$ as a function of $h\nu$ in an exemplary embodiment of the disclosure.

Figure 4:
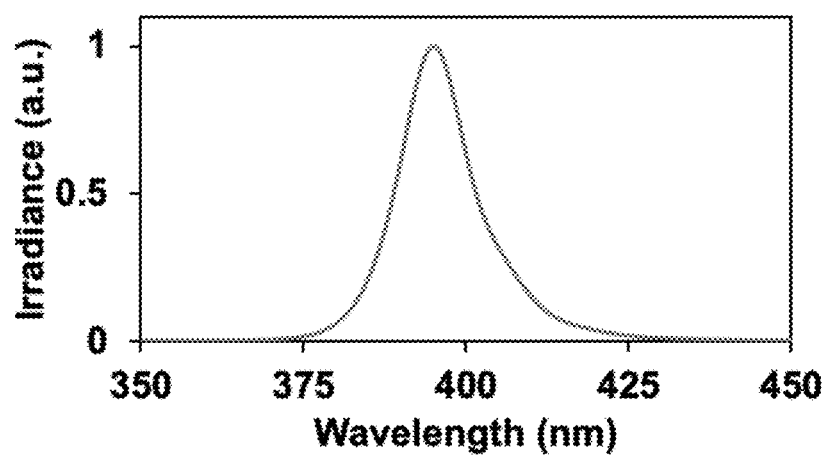

FIG. 4 shows irradiance spectrum of the excitation source used in obtaining the PEC measurements, with peak wavelength of the excitation determined as 395 nm, in an exemplary embodiment of the disclosure.

Figure 5:
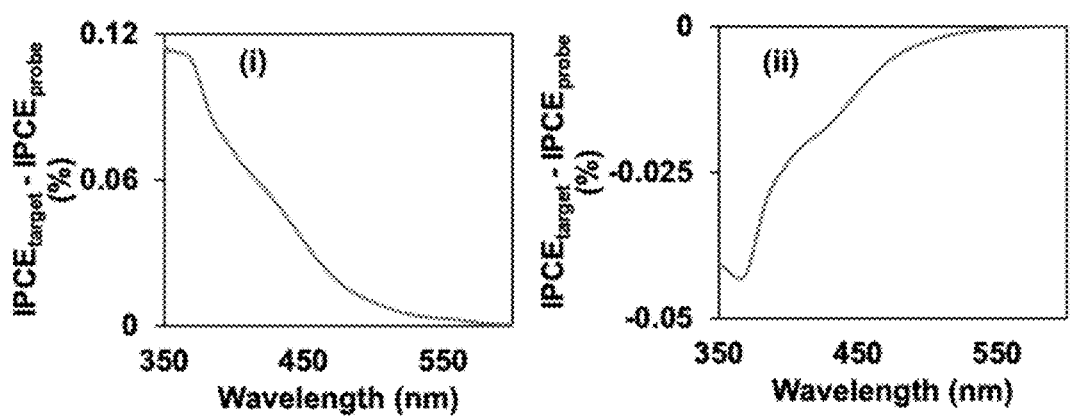

FIG. 5 shows the difference of the IPCE values obtained before and after target hybridization for the (i) 15-mer and (ii) 20-mer probes to illustrate the wavelength variation of hybridization-induced signal change in exemplary embodiments of the disclosure.

Figure 6:
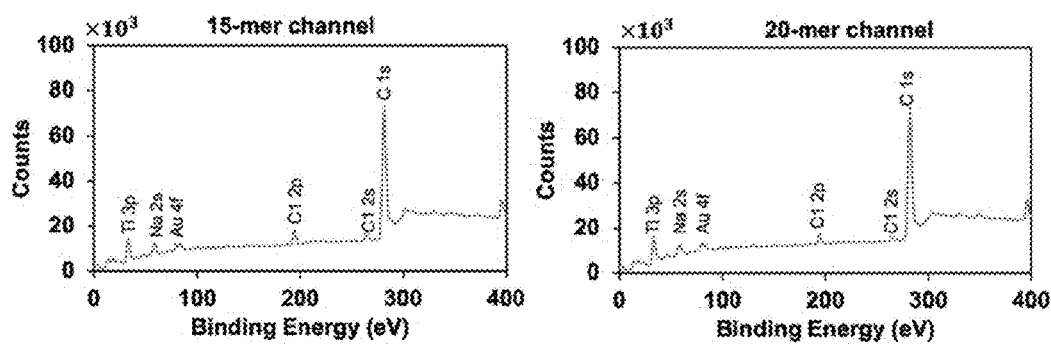

FIG. 6 shows the spectra obtained by X-ray photoelectron spectroscopy (XPS) analysis of the 15-mer and 20-mer channels, with the characteristic Au 4f spectral line at 83.8 eV, in exemplary embodiments of the disclosure.

Figure 7A:
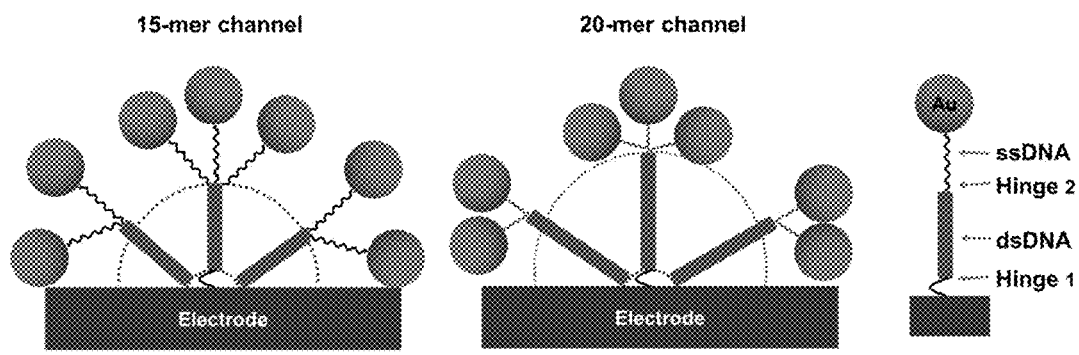

FIG. 7A shows the physics of differential signaling in the 15-mer and 20-mer channels in an exemplary embodiment of the disclosure. FIG. 7A shows a schematic diagram of the molecular building blocks of the 15-mer and 20-mer channels by considering the dsDNA as a rod-like structure and ssDNA as a flexible string-like structure on a model planar surface.

Figure 7B:
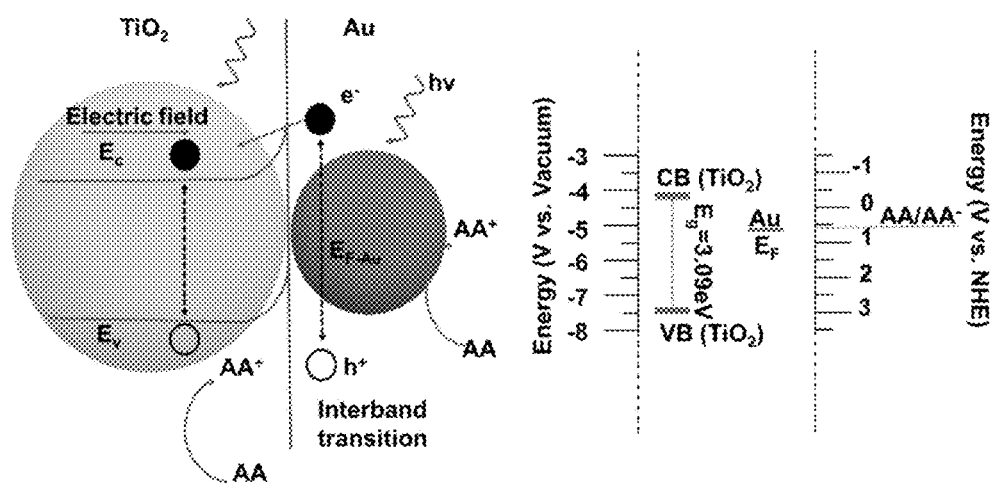

FIG. 7B shows the physics of differential signaling in the 15-mer and 20-mer channels in an exemplary embodiment of the disclosure. FIG. 7B shows a band diagram and Schottky contact formation at the $TiO_2$—Au interface (left) and valence and conduction band energy level for $TiO_2$ and Fermi energy level for Au NP are drawn with respect to vacuum and NHE (right); ascorbic acid (AA) oxidation potential is depicted using a dotted line.

Figure 7C:
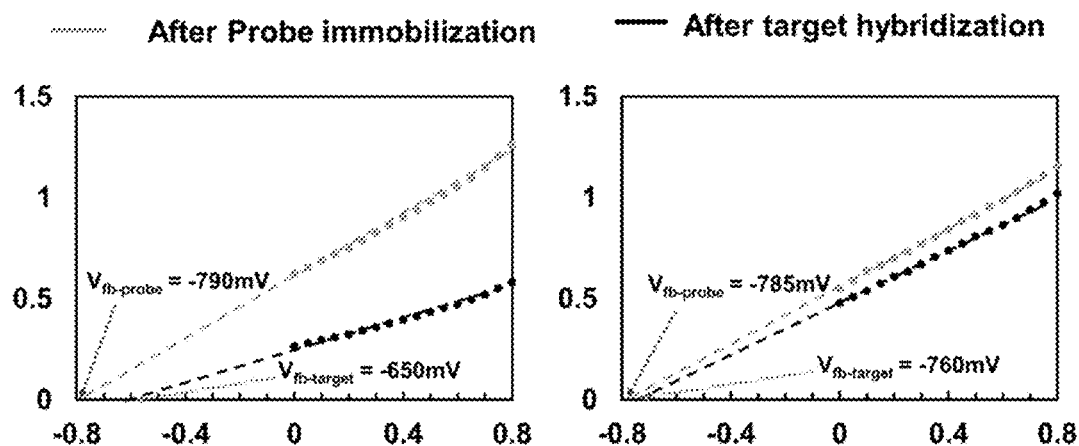

FIG. 7C shows the physics of differential signaling in the 15-mer and 20-mer channels in an exemplary embodiment of the disclosure. FIG. 7C shows Mott-Schottky ($1/C^2$ versus voltage) plots for 15-mer and 20-mer channels, before and after hybridization with the Au NP-labelled 25-mer target.

Figure 8:
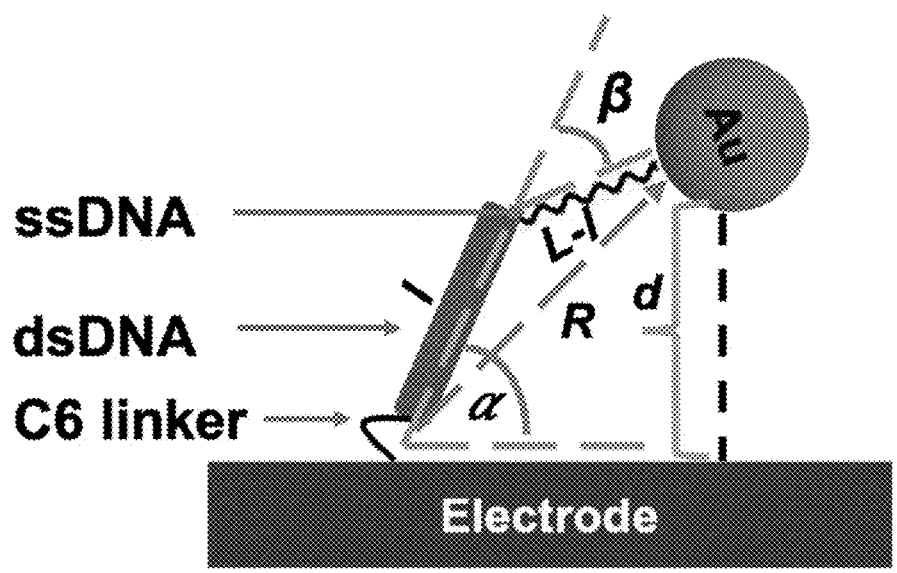

FIG. 8 shows a schematic model depicting the DNA structure after hybridization in an exemplary embodiment of the disclosure: the contour length, L, of the DNA is 8.34 nm (25-mer) as each base-pair is shown to be 0.34 nm in length and the overall structure has four sections: C6 linker (considered to be 1 nm), dsDNA (denoted by 1, which is 5 nm for 15-mer channel and 6.67 nm for 20-mer channel), ssDNA, Au NP (12 nm diameter) with the angle between electrode and dsDNA ($\alpha$), and the angle between dsDNA and ssDNA ($\beta$) varying with the movement of these two sections to calculate end-to-end distance, R, of the two DNA polymer sections with different flexibility.

Figure 9A:
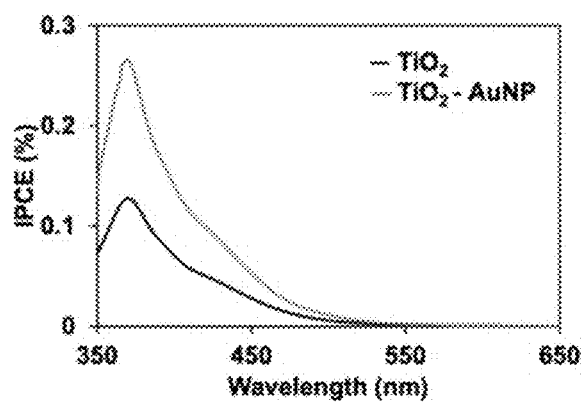

FIG. 9A shows a photoelectrochemical comparison between $TiO_2$ and $TiO_2$—Au NP samples in exemplary embodiments for the disclosure: FIG. 9A shows an IPCE spectrum of the photoactive electrodes before and after modification with Au NPs.

Figure 9B:
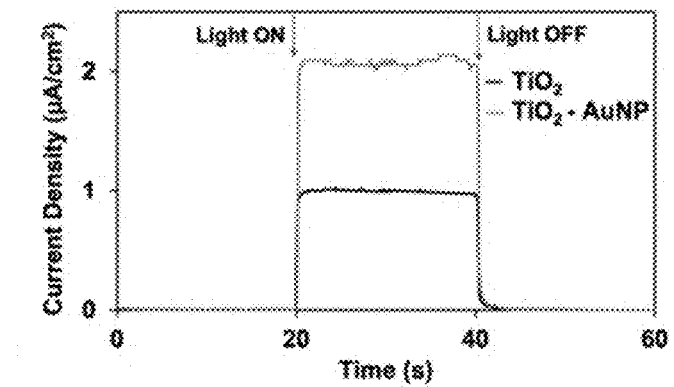

FIG. 9B shows a photoelectrochemical comparison between $TiO_2$ and $TiO_2$—Au NP samples in exemplary embodiments for the disclosure: FIG. 9B shows PEC curves of the photoelectrodes obtained using chopped light chronoamperometry at UV—both measurements were performed at 0 V bias versus Ag/AgCl and the electrolyte used was 0.1 M ascorbic acid in 0.1 M phosphate buffer solution.

Figure 10:
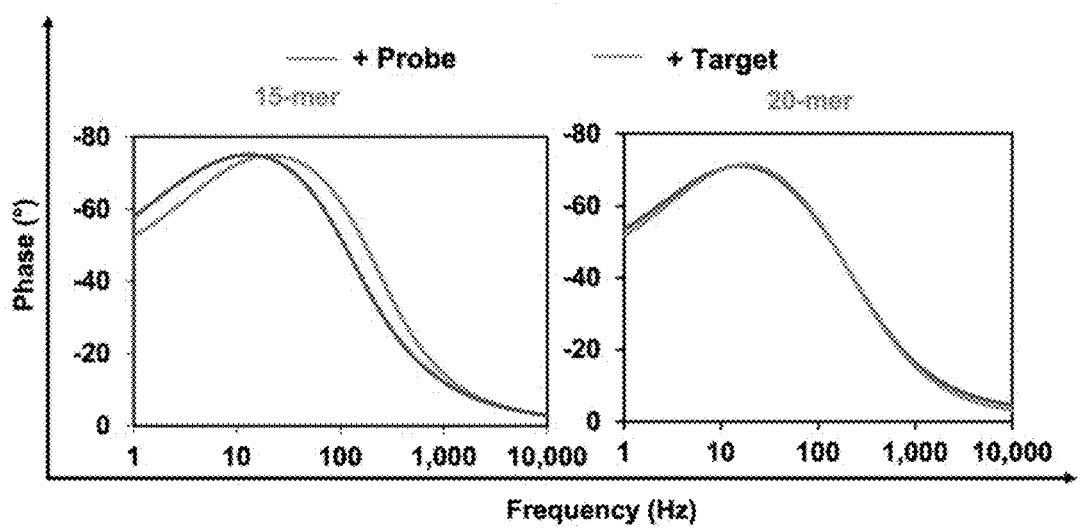

FIG. 10 shows a phase diagram of the 15-mer and 20-mer channels before and after hybridization with a 25-mer Au NP-labelled complementary target obtained from electrochemical impedance spectroscopy (EIS) in exemplary embodiments for the disclosure.

Figure 11:
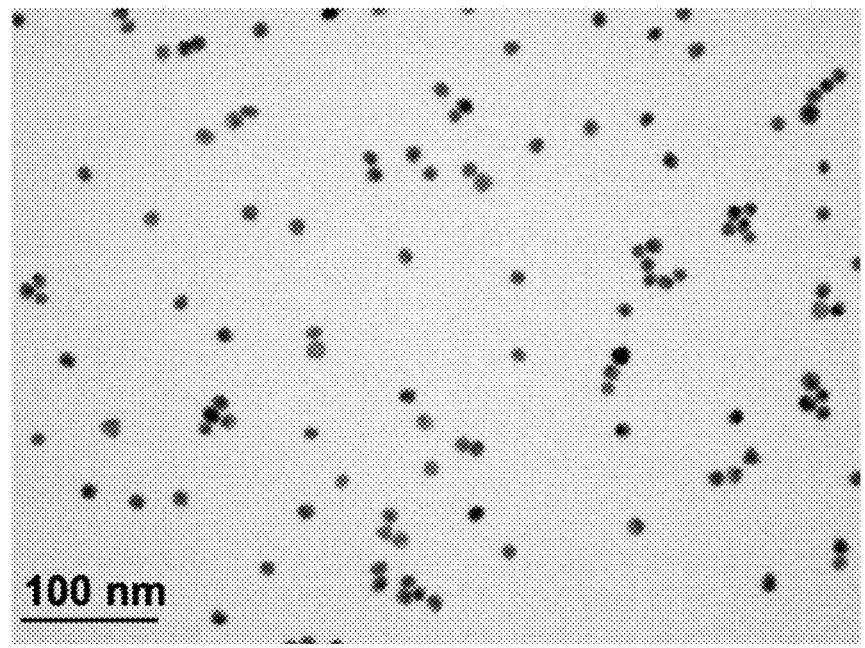

FIG. 11 shows Au NPs as imaged using transmission electron microscopy (TEM), showing an average size of 12 nm, in an exemplary embodiment of the disclosure.

Figure 12:
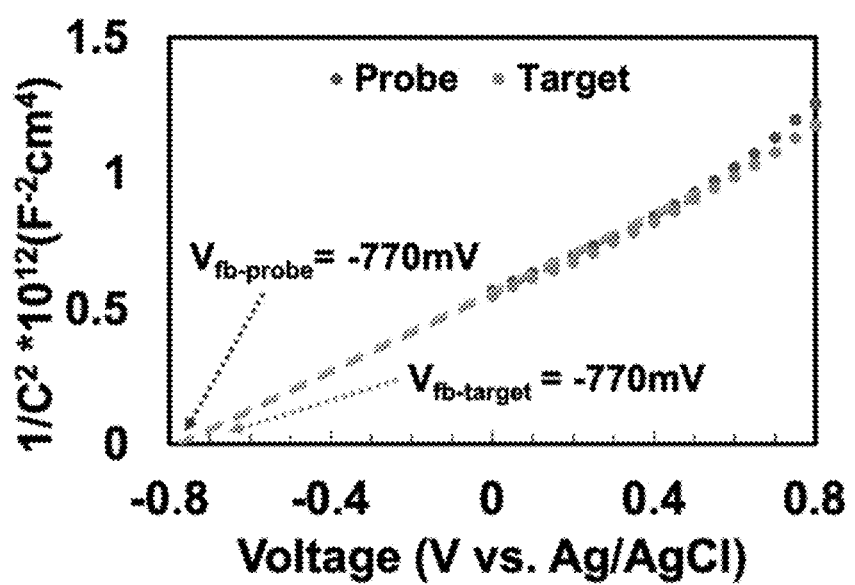

FIG. 12 shows the Mott-Schottky plot for the hybridization of un-labelled 25-mer DNA targets on the 15-mer channel, where both the slope and flat-band potential remain unchanged after target hybridization in an exemplary embodiment of the disclosure.

Figure 13:
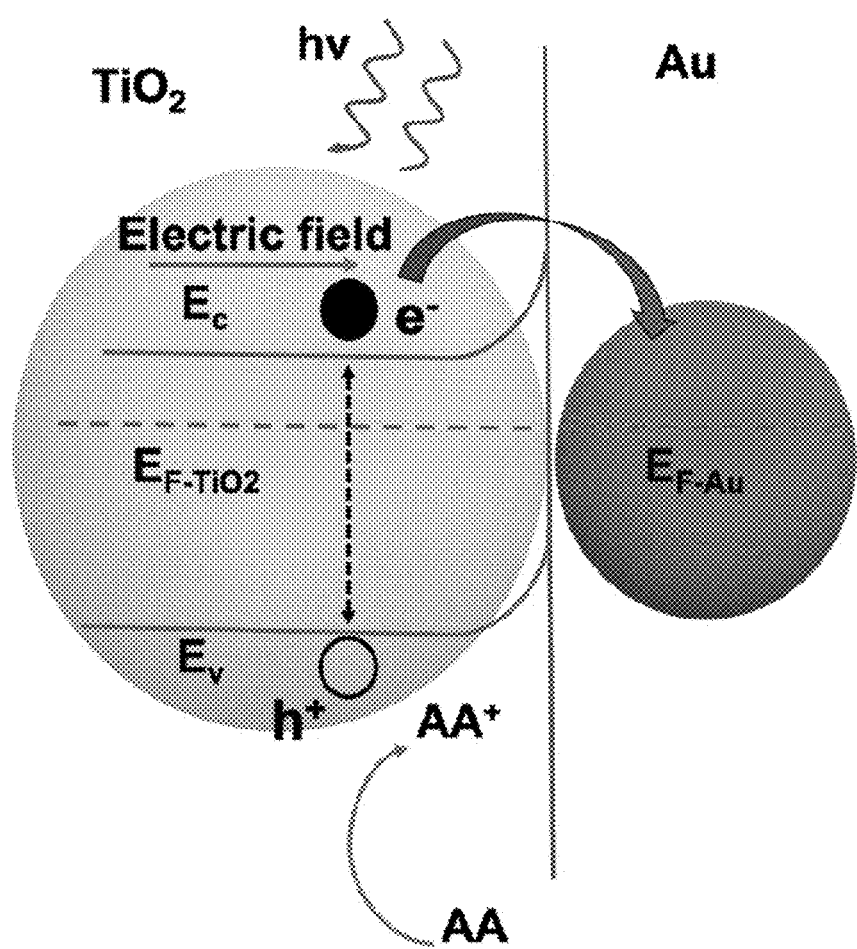

FIG. 13 shows a schematic illustrating the photocharging process wherein under light excitation, conduction band electrons move to Au NPs and improve electron-hole separation—$E_c$ and $E_v$ denote the conduction band and valence band position, respectively, $E_F$ denotes the fermi-level position, and holes (h+) from $TiO_2$ oxidize ascorbic acid (AA) to produce photocurrent—in an exemplary embodiment of the disclosure.

Figure 14:
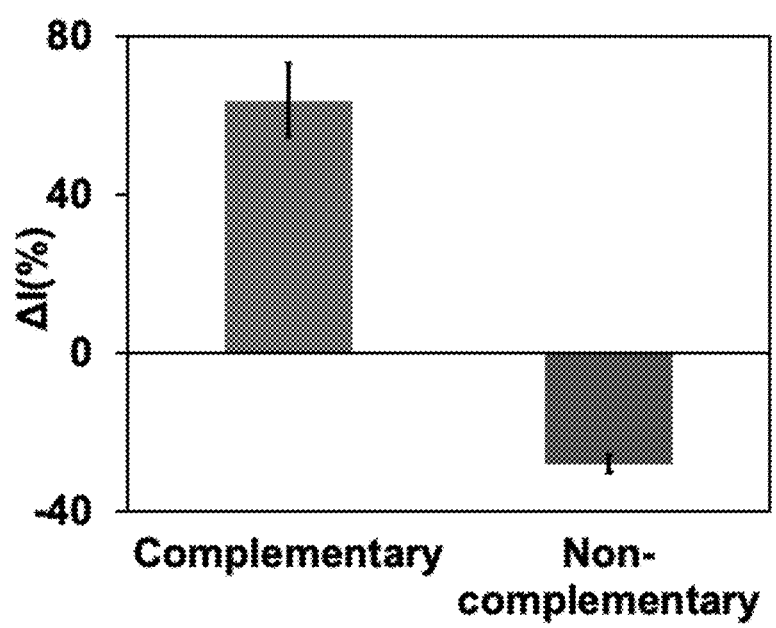

FIG. 14 shows a bar plot illustrating the percentage change in photocurrents following hybridization of the 20-mer probes with 34-mer Au NP-labelled complementary targets (the error bars represent standard deviation from at least three separate trials) in an exemplary embodiment of the disclosure.

Figure 15A:
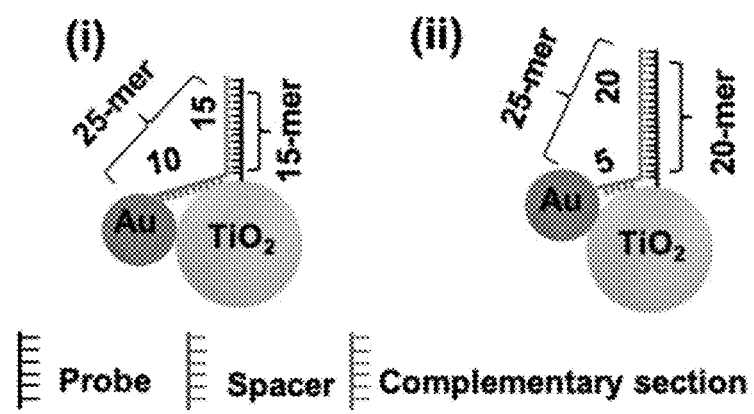

FIG. 15A shows hybridization experiments with Au NP attached to the proximal end of 25-mer DNA and hybridized with 15-mer and 20-mer probes in exemplary embodiments of the disclosure. FIG. 15A shows a schematic illustration of (i) 15-mer and (ii) 20-mer channels after hybridization with AuNP-labelled target.

Figure 15B:
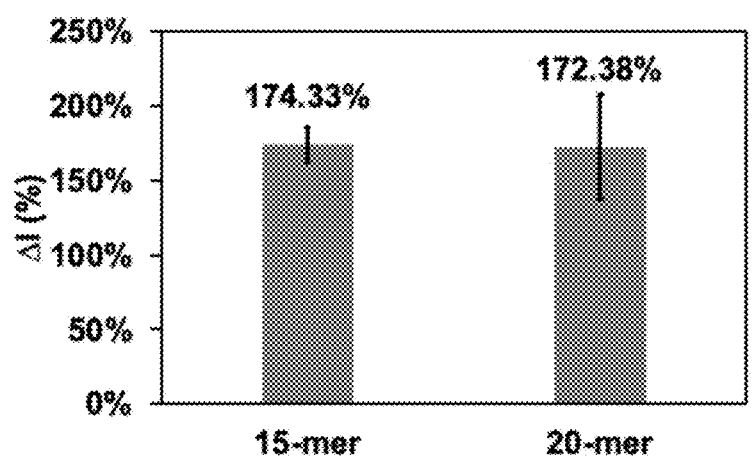

FIG. 15B shows hybridization experiments with Au NP attached to the proximal end of 25-mer DNA and hybridized with 15-mer and 20-mer probes in exemplary embodiments of the disclosure. FIG. 15B shows photocurrent enhancement for 15-mer and 20-mer channels.

Figure 16A:
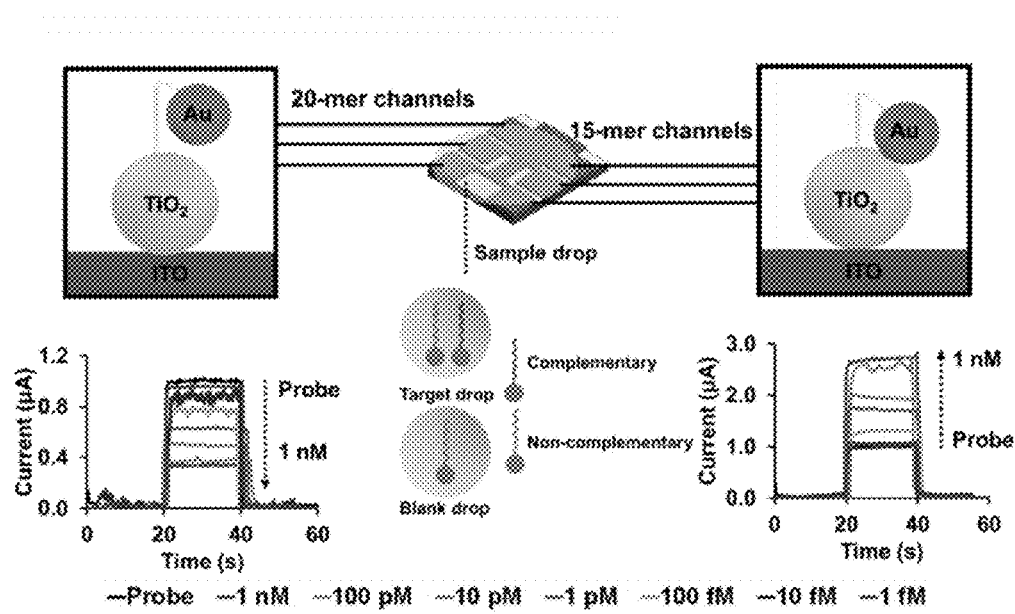

FIG. 16A shows the differential biosensing enabled by DNA nano-spacers in an exemplary embodiment of the disclosure. FIG. 16A shows an illustration of the multiplexed differential biosensor design (top) and the corresponding PEC data for various concentrations of target 25-mer AuNP-labeled DNA on the 20-mer and 15-mer channels.

Figure 16B:
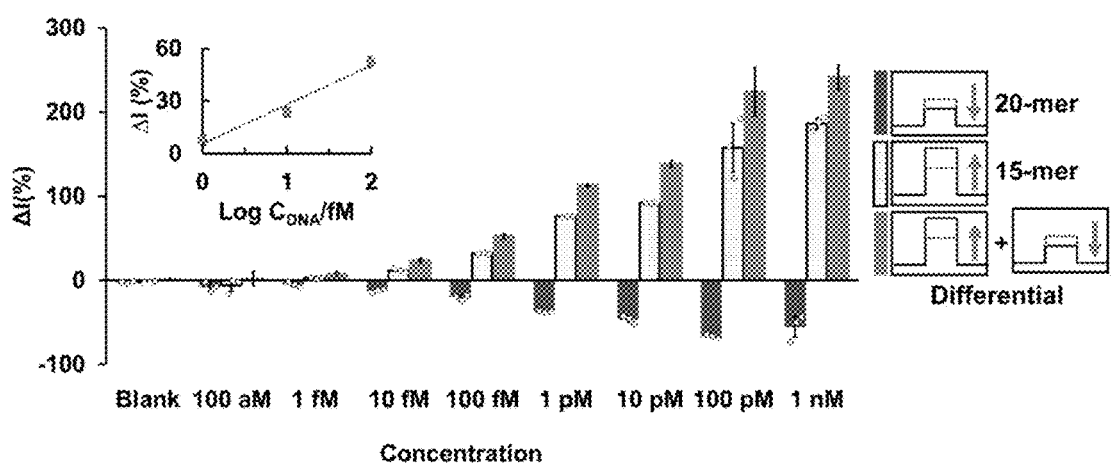

FIG. 16B shows the differential biosensing enabled by DNA nano-spacers in an exemplary embodiment of the disclosure. FIG. 16B show graphs depicting signal change obtained upon incubation with blank and target drops on the 15-mer and 20-mer-channels—the differential signal changes are calculated by adding the magnitude of signal changes obtained from the 15-mer and 20-mer channels; inset shows the calibration curve for determining the limit-of-detection (error bars represent one standard deviation, with experiments performed using at least three separate devices).

Figure 17A:
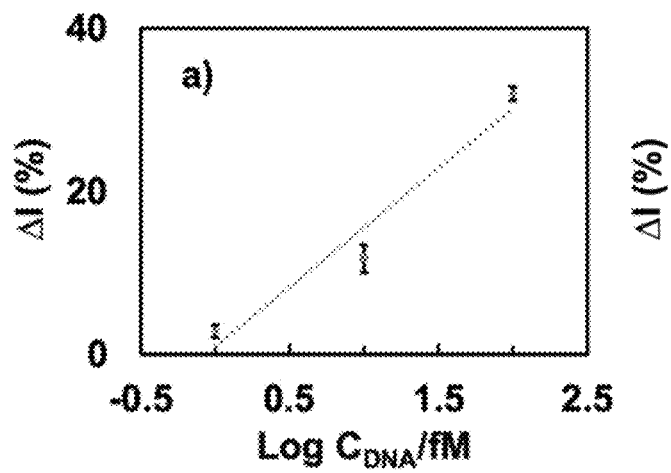

FIG. 17A shows calibration curves for the 15-mer channel for various concentration of target DNA in exemplary embodiments of the disclosure.

Figure 17B:
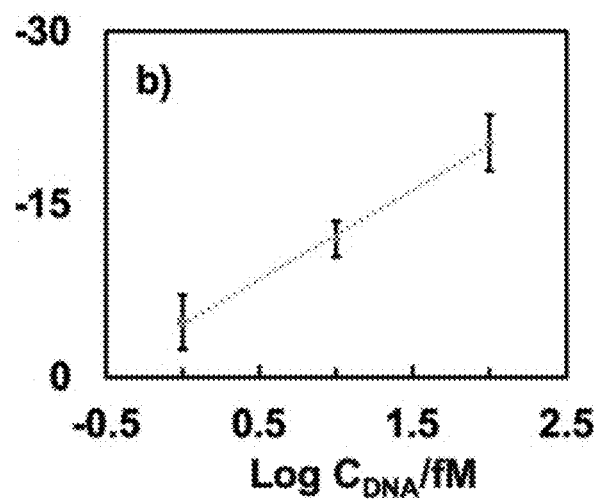

FIG. 17B shows calibration curves for the 20-mer channel for various concentration of target DNA in exemplary embodiments of the disclosure.

Figure 18:
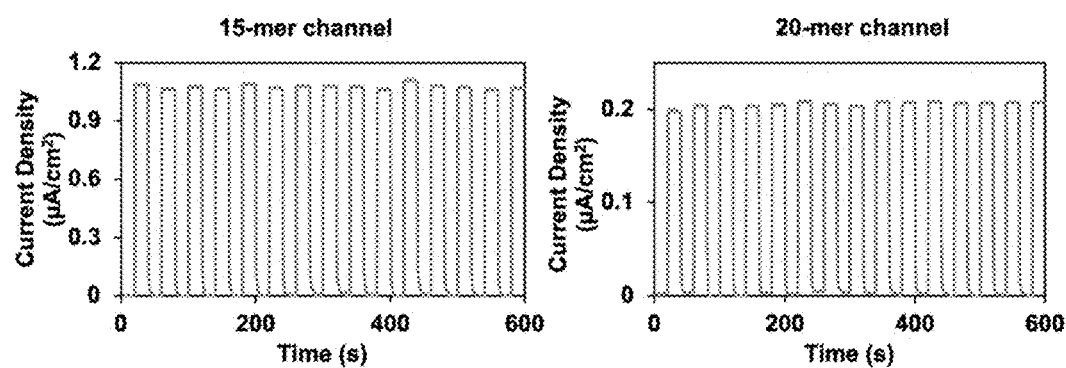

FIG. 18 shows a stability test of both 15-mer and 20-mer channels over 15 illumination cycles using photocurrent density measurements and a cycle period of 40 s with 50% times of illumination in an exemplary embodiment of the disclosure.

Figure 19:
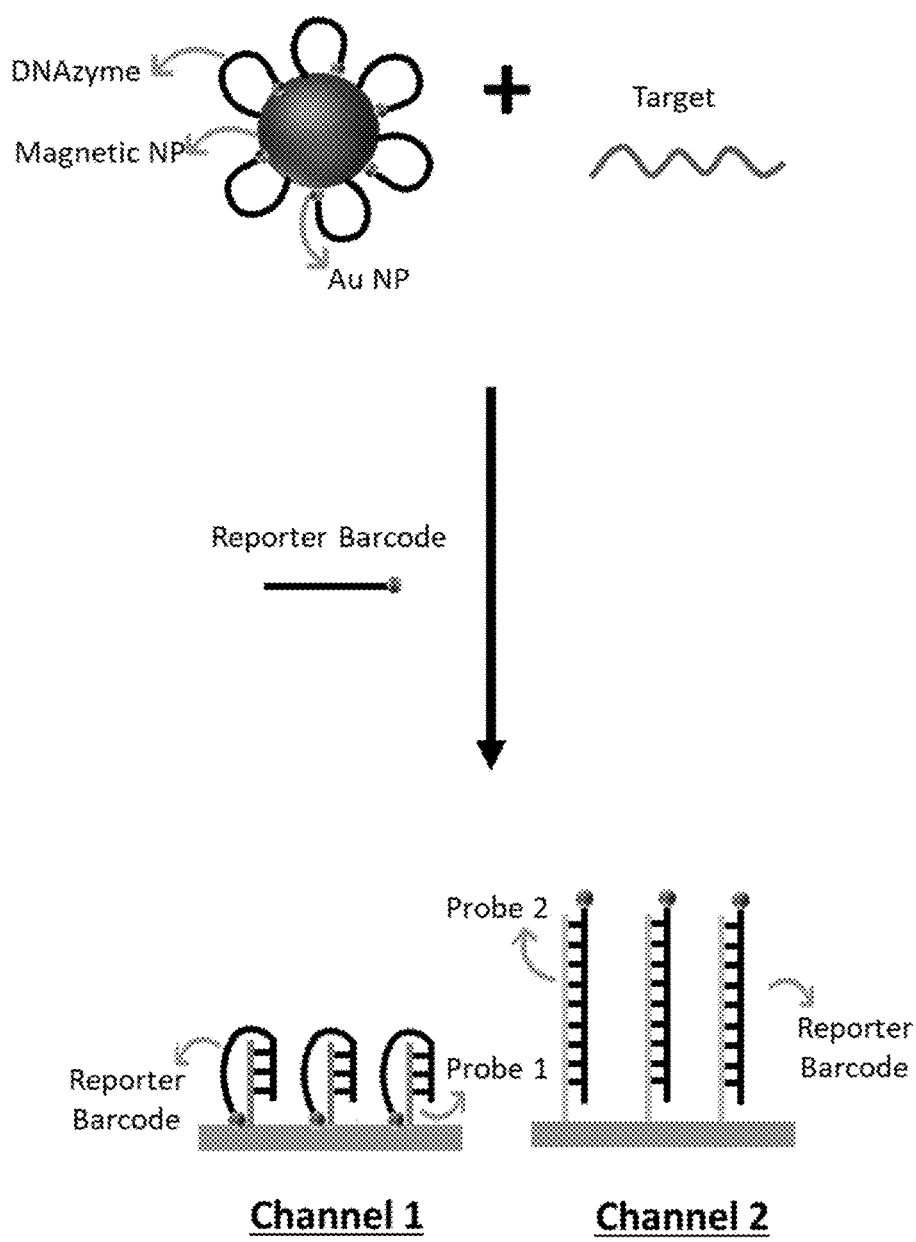

FIG. 19 shows a schematic depicting a two-channel PEC sensor biofunctionalized with nucleic acid probes designed for DNAzyme-based detection of nucleic acid targets in an exemplary embodiment of the disclosure.

Figure 20:
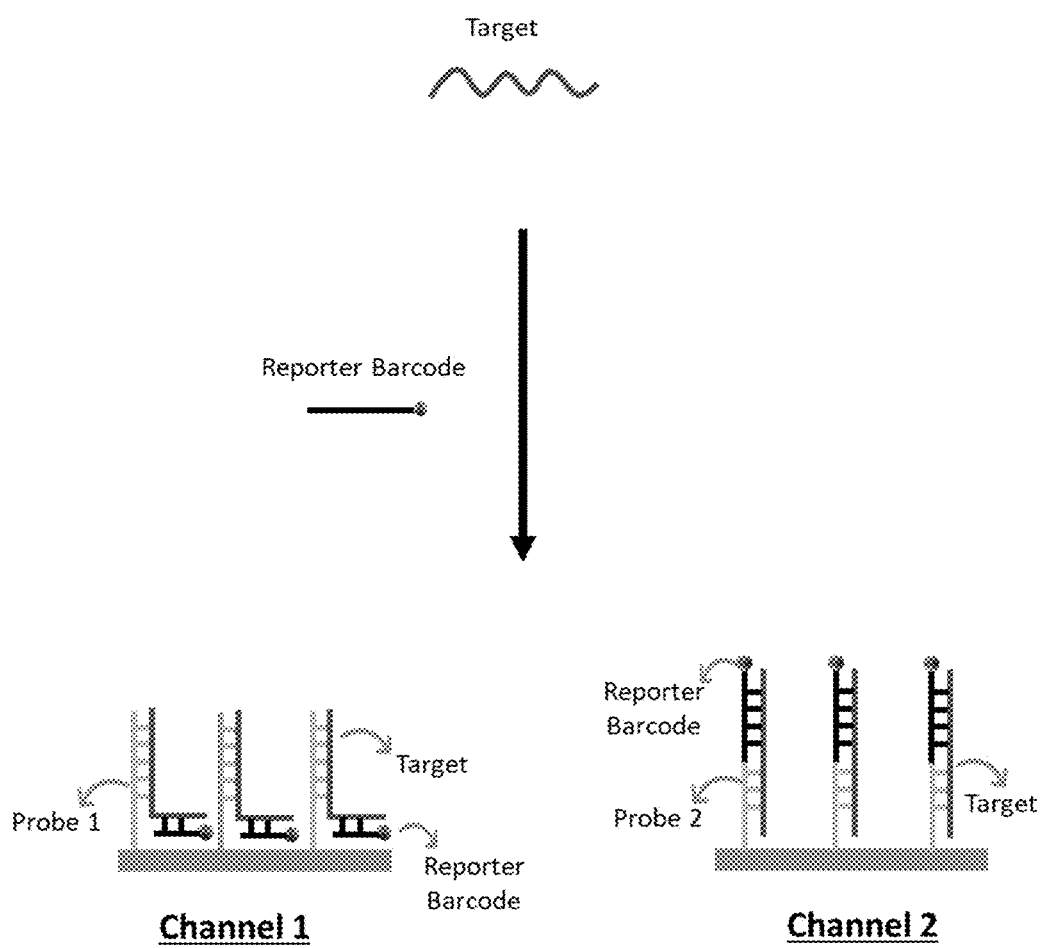

FIG. 20 shows a schematic depicting a two-channel PEC sensor biofunctionalized with nucleic acid probes designed for sandwich assay detection of nucleic acid targets in an exemplary embodiment of the disclosure.

Figure 21:
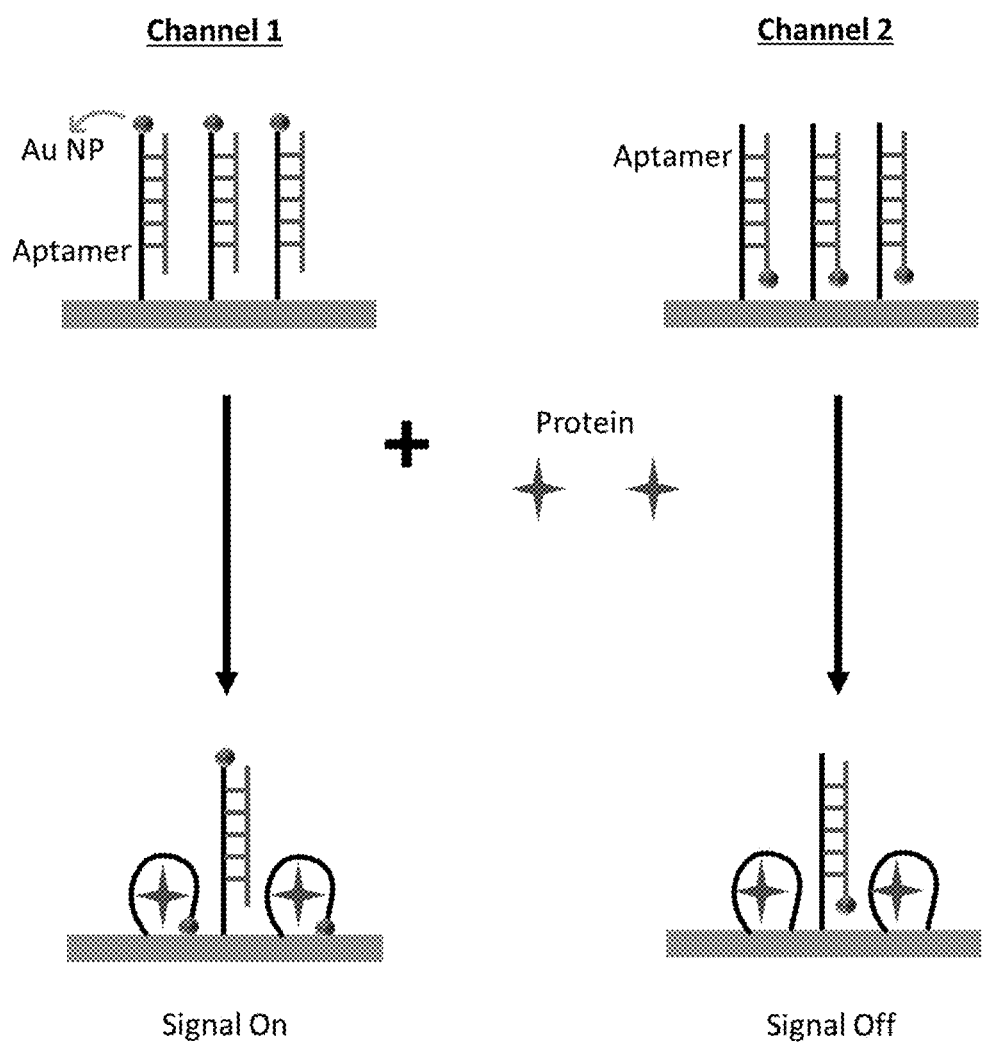

FIG. 21 shows a schematic depicting a two-channel PEC sensor biofunctionalized with aptamers for the detection of non-nucleic acid targets in an exemplary embodiment of the disclosure.

DETAILED DESCRIPTION

I. Definitions

Unless otherwise indicated, the definitions and embodiments described in this and other sections are intended to be applicable to all embodiments and aspects of the present disclosure herein described for which they are suitable as would be understood by a person skilled in the art. It is also to be understood that the terminology used herein is for the purpose of describing particular aspects only and is not intended to be limiting.

The term "sample" or "test sample" as used herein refers to any material in which the presence or amount of a target analyte is unknown and can be determined in an assay. The sample may be from any source, for example, any biological (e.g. human or animal samples, including clinical samples), environmental (e.g. water, soil or air) or natural (e.g. plants) source, or from any manufactured or synthetic source (e.g. food or drinks). The sample may be comprised or is suspected of comprising one or more analytes. The sample may be a "biological sample" comprising cellular and non-cellular material, including, but not limited to, tissue samples, saliva, sputum, urine, blood, serum, other bodily fluids and/or secretions. In some embodiments, the sample comprises saliva, sputum, oropharyngeal and/or nasopharyngeal secretions.

The term "target", "analyte" or "target analyte" as used herein refers to any agent, including, but not limited to, a small inorganic molecule, small organic molecule, metal ion, biomolecule, toxin, biopolymer (such as a nucleic acid, carbohydrate, lipid, peptide, protein), cell, tissue, microorganism and virus, for which one would like to sense or detect. The analyte may be either isolated from a natural source or is synthetic. The analyte may be a single compound or a class of compounds, such as a class of compounds that share structural or functional features. The term analyte also includes combinations (e.g. mixtures) of compounds or agents such as, but not limited, to combinatorial libraries and samples from an organism or a natural environment.

The term "nucleic acid" as used herein refers to a polynucleotide, such as deoxyribonucleic acid (DNA), ribonucleic acid (RNA), modified nucleotides and/or nucleotide derivatives, and may be either double stranded (ds) or single stranded (ss). In some embodiments, modified nucleotides may contain one or more modified bases (e.g. tritiated bases and unusual bases such as inosine), modified backbones (e.g. peptide nucleic acid, PNA) and/or other chemically, enzymatically, or metabolically modified forms.

The term "functional nucleic acid" as used herein refers to a nucleic acid molecule or oligonucleotide sequence that can bind to a specific analyte and/or catalyze or initiate a reaction such as, but not limited to, an aptamer or DNAzyme. Functional nucleic acids may be single-stranded DNA, and may include RNA, modified nucleotides and/or nucleotide derivatives.

The term "aptamer" as used herein refers to a short, chemically synthesized nucleic acid molecule or oligonucleotide sequence which can be generated by in vitro selection to fold into specific three-dimensional structures that bind to a specific analyte with dissociation constants, for example, in the pico- to nano-molar range. Aptamers may be naturally occurring RNA aptamers termed "riboswitches". Functional aptamer sequences may also be rationally designed, truncated, conjugated or otherwise modified from original parent (or full length) aptamers.

The term "DNAzyme", "deoxyribozyme", or "catalytic nucleic acid" as used herein refers to a nucleic acid molecule or oligonucleotide sequence that can catalyze or initiate a reaction. A DNAzyme may comprise an aptamer domain or is a DNAzyme-aptamer conjugate. A DNAzyme may be "RNA-cleaving" and catalyzes the cleavage of a particular substrate, for example a nucleic acid sequence comprising one or more ribonucleotides, at a defined cleavage site. A DNAzyme can be activated when bound to a substrate, for example, a target analyte. A DNAzyme described herein can be a part of a capture probe.

The term "capture probe" as used herein refers to a molecule (e.g. compound) that recognizes and binds (e.g. hybridizes) to a target analyte and/or a reporter moiety. The capture probe may comprise a nucleic acid, aptamer, DNAzyme, enzyme, and/or antibody. In some embodiments, a capture probe comprises a nucleic acid, aptamer, DNAzyme, enzyme, and/or antibody. In some embodiments, the capture probe is immobilized or coupled to a support, for example, a solid support, for example, a photoelectrode. In some embodiments, the capture probe comprises a biopolymer. In some embodiments, the capture probe comprises a nucleic acid having nucleic acid sequence that hybridizes to a complementary or partially complementary sequence.

The term "reporter moiety" as used herein refers to a moiety comprising a molecule (e.g. compound) for reporting the presence of an analyte. For example, the moiety is used for transducing the presence of an analyte recognized by the recognition moiety to a detectable signal. The reporter moiety may be a detectable label alone, or alternatively, a molecule modified with a detectable label. The reporter moiety may be a molecule modified with a redox, photo-electrochemical, passivating, semi-conductive and/or conductive species. In some embodiments, the reporter moiety comprises a molecule modified with a detectable label. In some embodiments, the reporter moiety comprises a nucleic acid modified with a detectable label.

The term "hybridization" or "hybridize" as used herein refers to the sequence specific non-covalent binding interaction with a complementary, or partially complementary, nucleic acid sequence. Binding by complementarity has the same meaning as hybridizing, referring to the sequence specific non-covalent binding interaction with a complementary, or partially complementary, nucleic acid sequence.

The term "functionalizing" or "functionalized on" as used herein refer to various common approaches for functionalizing a material, which can be classified as mechanical, physical, chemical and biological. Any suitable form of coupling may be utilized (e.g. coating, binding, etc.).

The term "photoelectrode" or "photoactive electrode" as used herein refer to a semiconducting material having a photoactive material such as a photocatalyst. A photoelectrode may be a layer such as a transparent electrode layer disposed on the light incident side or on the viewing (observation) side. A photoelectrode can include a conductive substrate having a photoactive material (e.g. semiconductor coating). The substrate may include glass, polymer, metal or a combination thereof. The polymer may include polyethylene terephthalate (PET), polyethylene naphthalate (PEN) or polyimide (PI). If the substrate of the conductive substrate is made of non-conductive glass or polymers, a conductive material is provided such as, for example, indium tin oxide (ITO), fluorine-doped tin oxide (FTO), antimony-doped tin oxide (ATO), aluminum-doped zinc oxide (AZO), gallium-doped zinc oxide (GZO), indium-doped zinc oxide (IZO) or a combination thereof.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies. In addition, all ranges given herein include the end of the ranges and also any intermediate range points, whether explicitly stated or not.

As used in this disclosure, the singular forms "a", "an" and "the" include plural references unless the content clearly dictates otherwise.

In embodiments comprising an "additional" or "second" component, the second component as used herein is chemically different from the other components or first component. A "third" component is different from the other, first, and second components, and further enumerated or "additional" components are similarly different.

The term "and/or" as used herein means that the listed items are present, or used, individually or in combination. In effect, this term means that "at least one of" or "one or more" of the listed items is used or present.

The abbreviation, "e.g." is derived from the Latin exempli gratia and is used herein to indicate a non-limiting example. Thus, the abbreviation "e.g." is synonymous with the term "for example." The word "or" is intended to include "and" unless the context clearly indicates otherwise.

Although methods and materials similar or equivalent to those described herein can be used in the practice or testing of this disclosure, suitable methods and materials are described below.

II. Biosensors and Methods of the Disclosure

The present disclosure discloses a multiplexed photoelectrochemical DNA detector that achieves differential signaling—signal-on and signal-off readout—for example, on a single device, which increases the device sensitivity. DNA is used as a nano-spacer to change the probability of direct electron transfer between semiconducting and plasmonic nanoparticles under optical excitation. Herein, it is demonstrated that upon hybridizing Au NP-labelled target DNA with capture probe DNA sequences of varying length, the relative length of the single-stranded to the double-stranded segments of the DNA complex determines the signaling behaviour of the electrode channels as the differences in the motional dynamics (e.g. bending) of the DNA probes on different channels is used to control the interactions between Au and $TiO_2$ nanoparticles positioned at the two ends of the DNA nano-spacer. Incident photon to current conversion efficiency, UV/VIS spectroscopy, and carrier lifetime measurement through electrochemical impedance spectroscopy indicate that direct transfer of hot electrons from the metallic to the semiconductive nanoparticles is responsible for the signal-on response and steric hindrance is responsible for the signal-off response. Hybridizing 15-mer probes with 25-mer targets and 20-mer probes with 34-mer targets resulted in a signal-on response; whereas hybridizing 20-mer probes with 25-mer targets switched the response of the system to signal-off.

Combined, DNA of different length is used to program the response of two sensing channels of a differential photoelectrochemical biosensor to predictively increase or decrease the photoelectrochemical signal based on the separation between the metallic NP label and the semiconducting electrode. The differential photoelectrochemical biosensor developed herein increases the device sensitivity by more than three times compared to a single channel design and demonstrates a limit-of-detection of 800 aM with a three-decade log linear dynamic range for single-stranded oligonucleotides. The differential signal readout strategy i)

increases the sensitivity, ii) allows for operation at low bias voltage (0V herein), iii) significantly reduces the blank signal noise, and iv) decreases the possibility of false positive signal.

This strategy of utilizing differential nanoscopic interactions between metallic nanoparticles and semiconducting electrode surfaces for specific target recognition can also be used for detection of non-nucleic acid targets using biofunctionalization with functional nucleic acids, such as aptamers and DNAzymes.

Accordingly, provided herein is a biosensor for detecting a target analyte in a sample comprising:
  a first photoelectrode comprising a conductive substrate and a photoactive material;
  a second photoelectrode comprising a conductive substrate and a photoactive material;
  a first capture probe functionalized on the first photoelectrode;
  a second capture probe functionalized on the second photoelectrode; and
  optionally one or more reporter moieties comprising a detectable label;
  wherein the first capture probe and the second capture probe each, independently, provides a distance between the detectable label and the photoactive material in the presence of the target analyte,
  wherein intensity of detection signal dictated by the distance is generated from the first photoelectrode and the second photoelectrode by transfer of electrons between the detectable label and the photoactive material, and
  wherein a higher intensity of the detection signal from the first photoelectrode as compared to the second photoelectrode in the presence of the sample, or a higher increase in the intensity of the detection signal from the first photoelectrode as compared to the second photoelectrode in the presence of the sample as compared to in the absence of the sample, is indicative of the presence of the target analyte.

In some embodiments, the target analyte is a nucleic acid, wherein the first capture probe is capable of binding to a portion of the target analyte by complementarity, the second capture probe is capable of binding to a portion the target analyte by complementarity, and the reporter moiety is capable of binding to a portion of the target analyte by complementarity, and wherein the portion of the target analyte that can bind to the first capture probe or the second capture probe is a different portion than can bind to the reporter moiety. In some embodiments, the first capture probe and the second capture probe each, independently, recognizes and binds to the target analyte. In some embodiments, the first capture probe and the second capture probe each, independently, comprises a molecule that recognizes and binds to the target analyte. In some embodiments, the first capture probe and the second capture probe each, independently, comprises a nucleic acid that binds by complementarity to the target analyte. In some embodiments, the target analyte comprises or is a nucleic acid. In some embodiments, the first capture probe and the second capture probe each, independently, regulates or dictates the distance between the detectable label and the photoactive electrode, conductive substrate, and/or photoactive material in the presence of the target analyte. In some embodiments, the detection signal is a change in photoelectrochemical current, voltage or impedance. In some embodiments, the detection signal is a change in photoelectrochemical current. Differential signal changes are calculated by adding the magnitude of detection signal changes. In some embodiments, the first photoelectrode is configured to provide an increase in the intensity of the detection signal and the second photoelectrode is configured to provide a decrease in the intensity of the detection signal in the presence of the target analyte as compared to in the absence of the target analyte. In some embodiments, binding of the target analyte to the first capture probe brings the detectable label closer to the conductive substrate and/or photoactive material of the first photoelectrode than binding of the target analyte to the second capture probe in bringing the detectable label closer to the conductive substrate and/or photoactive material of the second photoelectrode. In some embodiments, the first capture probe and the second capture probe each, independently, comprises a biopolymer. In some embodiments, the first capture probe and the second capture probe each, independently, comprises a nucleic acid having a nucleic acid sequence that hybridizes to the target analyte and/or reporter moiety. In some embodiments, the nucleic acid is single-stranded DNA, single-stranded RNA, single-stranded PNA, double-stranded DNA, and/or double-stranded RNA. In some embodiments, the first capture probe and the second capture probe each, independently, comprises a functional nucleic acid. In some embodiments, the functional nucleic acid is an aptamer or DNAzyme, optionally, an RNA-cleaving DNAzyme. In some embodiments, the first capture probe and the second capture probe are each, independently, smaller than or equal to the target analyte in size. In some embodiments, the first capture probe is a different size than the second capture probe. In some embodiments, the first capture probe is smaller than the second capture probe. In some embodiments, the first capture probe is about 60% the size of the target analyte and the second capture probe is about 80% the size of the target analyte. In some embodiments, the first capture probe is larger than the second capture probe. In some embodiments, the target analyte is a nucleic acid, a carbohydrate, a lipid, a peptide, a protein, a small inorganic molecule, a small organic molecule, a metal ion, a, toxin, a cell, a tissue, a microorganism, or a virus. In some embodiments, the target analyte is a nucleic acid.

In some embodiments, the reporter moiety is capable of binding to and being activated by the target analyte, wherein the activation of the reporter moiety releases a fragment comprising the detectable label whereby the fragment is capable of binding to the first capture probe and the second capture probe. In some embodiments, the first capture probe and the second capture probe each, independently, comprises a molecule that recognizes and binds to the reporter moiety comprising the detectable label. In some embodiments, the first capture probe and the second capture probe each, independently, comprises a nucleic acid that binds by complementarity to the reporter moiety comprising the detectable label. In some embodiments, the first capture probe and the second capture probe each, independently, regulates or dictates the distance between the detectable label and photoelectrode, conductive substrate and/or photoactive material. In some embodiments, the detection signal is a change in photoelectrochemical current, voltage or impedance. In some embodiments, the detection signal is a change in photoelectrochemical current. Differential signal changes are calculated by adding the magnitude of detection signal changes. In some embodiments, the first photoelectrode is configured to provide an increase in the intensity of the detection signal and the second photoelectrode is configured to provide a decrease in the intensity of the detection signal in the presence of the target analyte as compared to in the absence of the target analyte. In some embodiments, binding of the reporter moiety to the first capture probe brings the detectable label closer to the conductive substrate and/or photoactive material of the first photoelectrode than binding of the reporter moiety to the second capture probe in bringing the detectable label to the conductive substrate and/or photoactive material of the second photoelectrode. In some embodiments, the first capture probe and the second capture probe each, independently, comprises a biopolymer. In some embodiments, the first capture probe and the second capture probe each, independently, comprises a nucleic acid having a nucleic acid sequence that hybridizes to the reporter moiety. In some embodiments, the nucleic acid is single-stranded DNA, single-stranded RNA, single-stranded PNA, double-stranded DNA, and/or double-stranded RNA. In some embodiments, the first capture probe and the second capture probe each, independently, comprises a functional nucleic acid. In some embodiments, the functional nucleic acid is a DNAzyme, optionally, an RNA-cleaving DNAzyme. In some embodiments, the functional nucleic acid is a DNAzyme. In some embodiments, the first capture probe is smaller than or equal to the released fragment of the reporter moiety in size. In some embodiments, the second capture probe is smaller than or equal to the released fragment of the reporter moiety in size. In some embodiments, the first capture probe is a different size than the second capture probe. In some embodiments, the first capture probe is smaller than the second capture probe. In some embodiments, the first capture probe is about 60% the size of the released fragment of the reporter moiety and the second capture probe is about 80% the size of the released fragment of the reporter moiety. In some embodiments, the first capture probe is larger than the second capture probe. In some embodiments, the target analyte is a nucleic acid, a carbohydrate, a lipid, a peptide, a protein, a small inorganic molecule, a small organic molecule, a metal ion, a, toxin, a cell, a tissue, a microorganism, or a virus. In some embodiments, the target analyte is a nucleic acid. In some embodiments, the target analyte comprises a non-nucleic acid, optionally, a protein.

In some embodiments, the first capture probe comprises a first reporter moiety and the second capture probe comprises a second reporter moiety, wherein the first capture probe is capable of binding to the target analyte and the second capture probe is capable of binding to the target analyte, wherein upon binding of the target analyte to the first capture probe, the first reporter moiety comprising the detectable label is retained in the first capture probe, and wherein upon binding of the target analyte to the second capture probe, the second reporter moiety comprising the detectable label is released from the second capture probe. In some embodiments, the first capture probe and the second capture probe each, independently, comprises and/or are coupled to the reporter moiety prior to detecting the target analyte. In some embodiments, the first capture probe comprises and/or are coupled to the reporter moiety after detecting the target analyte. In some embodiments, the first capture probe and the second capture probe each, independently, recognizes and binds to the target analyte. In some embodiments, the first capture probe and the second capture probe each, independently, comprises a molecule that binds by complementarity to the target analyte. In some embodiments, the first capture probe and the second capture probe each, independently, regulates or dictates the distance between the detectable label and the photoelectrode, conductive substrate and/or photoactive material. In some embodiments, the detection signal is a change in photoelectrochemical current, voltage or impedance. In some embodiments, the detection signal is a change in photoelectrochemical current. Differential signal changes are calculated by adding the magnitude of detection signal changes. In some embodiments, the first photoelectrode is configured to provide an increase in the intensity of the detection signal and the second photoelectrode is configured to provide a decrease in the intensity of the detection signal in the presence of the target analyte as compared to in the absence of the target analyte. In some embodiments, binding of the target analyte to the first capture probe brings the detectable label closer to the conductive substrate and/or photoactive material of the first photoelectrode than before binding. In some embodiments, binding of the target analyte to the first capture probe brings the detectable label closer to the conductive substrate and/or photoactive material of the first photoelectrode than distance between the detectable label and the conductive substrate and/or photoactive material of the second photoelectrode before binding of the target analyte to the second capture probe. In some embodiments, the first capture probe and the second capture probe each, independently, comprises a biopolymer. In some embodiments, the first capture probe and the second capture probe each, independently, comprises a nucleic acid having a nucleic acid sequence that hybridizes to the target analyte and/or reporter moiety. In some embodiments, the nucleic acid is single-stranded DNA, single-stranded RNA, single-stranded PNA, double-stranded DNA, and/or double-stranded RNA. In some embodiments, the first capture probe and the second capture probe are each, independently, smaller than or equal to the target analyte in size. In some embodiments, the first capture probe and the second capture probe are each, independently, larger than or equal to the target analyte in size. In some embodiments, the first capture probe is a different size than the second capture probe. In some embodiments, the first capture probe is smaller than the second capture probe. In some embodiments, the first capture probe is about 60% the size of the target analyte and the second capture probe is about 80% the size of the target analyte. In some embodiments, the first capture probe is larger than the second capture probe. In some embodiments, the first capture probe couples to a first reporter moiety and the second capture probe couples to a second reporter moiety. In some embodiments, the first capture probe comprises a first reporter moiety and the second capture probe couples to a second reporter moiety. In some embodiments, the first capture probe and the second capture probe each, independently, comprises a functional nucleic acid. In some embodiments, the functional nucleic acid is an aptamer or DNAzyme, optionally, an RNA-cleaving DNAzyme. In some embodiments, the functional acid is an aptamer. In some embodiments, the aptamer is a double-stranded nucleic acid. In some embodiments, the first capture probe comprises a double-stranded nucleic acid aptamer comprising a detectable label on a nucleic acid strand coupled, conjugated, or attached to the first photoelectrode. In some embodiments, the second capture probe comprises a double-stranded nucleic acid aptamer comprising a detectable label on a nucleic acid strand that is not coupled, conjugated, or attached to the second photoelectrode. In some embodiments, the second capture probe comprises a double-stranded nucleic acid aptamer comprising a detectable label on a first nucleic acid strand that hybridizes to a second nucleic acid strand that is coupled, conjugated, or attached to the second photoelectrode. In some embodiments, the target analyte is a nucleic acid, a carbohydrate, a lipid, a peptide, a protein, a small inorganic molecule, a small organic molecule, a metal ion, a, toxin, a cell, a tissue, a microorganism, or a virus. In some embodiments, the target analyte is a nucleic acid. In some embodiments, the target analyte comprises a non-nucleic acid, optionally, a protein.

In some embodiments, the biosensor for detecting a target analyte in a sample comprises a first photoelectrode comprising a conductive substrate and a photoactive material, a second photoelectrode comprising a conductive substrate and a photoactive material, a first capture probe functionalized on the first photoelectrode, a second capture probe functionalized on the second photoelectrode, and at least one reporter moiety comprising a detectable label; wherein binding of the target analyte and/or the reporter moiety to the first capture probe results in a different detectable signal than binding of the target analyte and/or the reporter moiety to the second capture probe. In some embodiments, the target analyte comprises the reporter moiety. In some embodiments, the target analyte couples to the reporter moiety. In some embodiments, the first capture probe and the second capture probe each, independently, comprises and/or are coupled to the reporter moiety prior to detecting the target analyte. In some embodiments, the first capture probe and the second capture probe each, independently, comprises and/or are coupled to the reporter moiety after detecting the target analyte. In some embodiments, the first capture probe and the second capture probe each, independently, recognizes and binds to the target analyte. In some embodiments, the first capture probe and the second capture probe each, independently, comprises a molecule that recognizes and binds (e.g. hybridizes) to the target analyte comprising a detectable label. In some embodiments, the first capture probe and the second capture probe are nucleic acids. In some embodiments, the first capture probe and the second capture probe each, independently, comprises a nucleic acid that binds by complementarity to the target analyte. In some embodiments, the target analyte comprises nucleic acid. In some embodiments, the first capture probe and the second capture probe each, independently, regulates or dictates distance between the detectable label and the substrate or photoactive material. In some embodiments, the detection signal is a change in photoelectrochemical current, voltage or impedance. In some embodiments, the detection signal is a change in photoelectrochemical current. In some embodiments, the detection signal is a change in photoelectrochemical current, voltage or impedance. In some embodiments, the detection signal is a change in photoelectrochemical current. Differential signal changes are calculated by adding the magnitude of detection signal changes. In some embodiments, the first photoelectrode is configured to provide an increase in the signal or increase in the intensity in the detection signal and the second photoelectrode is configured to provide a decrease in the signal or decrease in the intensity in the detection signal. In some embodiments, binding of the target analyte to the first capture probe brings the detectable label closer to the photoactive material of the first photoelectrode than binding of the target analyte to the second capture probe of the second photoelectrode. In some embodiments, the first capture probe and the second capture probe each, independently, comprises a biopolymer. In some embodiments, the first capture probe and the second capture probe each, independently, comprises a nucleic acid sequence that hybridizes to the target analyte and/or reporter moiety. Examples include single-stranded DNA, single-stranded RNA, single-stranded PNA, double-stranded DNA, and/or double-stranded RNA. In some embodiments, the first capture probe and the second capture probe each, independently, comprises a functional nucleic acid. Examples include an aptamer or DNAzyme, optionally, an RNA-cleaving DNAzyme. In some embodiments, the first capture probe and the second capture probe are each, independently, smaller than or equal to the target analyte in size. In some embodiments, the first capture probe is a different size than the second capture probe. In some embodiments, the first capture probe is smaller than the second capture probe. In some embodiments, the first capture probe is about 60% the size of the target analyte and the second capture probe is about 80% the size of the target analyte. In some embodiments, the first capture probe is larger than the second capture probe. In some embodiments, the first capture probe couples to a first reporter moiety and the second capture probe couples to a second reporter moiety. In some embodiments, the first capture probe comprises a first reporter moiety and the second capture probe couples to a second reporter moiety. In some embodiments, the target analyte is a nucleic acid. In some embodiments, the target analyte comprises a non-nucleic acid, optionally, a protein.

Conductive substrate for the biosensor described herein can be any suitable conductive substrate known in the art. In some embodiments, the conductive substrate comprises a conductive material, and optionally a non-conductive material. In some embodiments, the conductive substrate of the first photoelectrode and the second photoelectrode each, independently, comprises metal, glass, polymer or a combination thereof. In some embodiments, the non-conductive material is glass or polymer. In some embodiments, the conductive substrate of the first photoelectrode and the second photoelectrode each, independently, comprises non-conductive glass or polymer and a conductive material. In some embodiments, the conductive material is selected from the group consisting of indium tin oxide (ITO), fluorine-doped tin oxide (FTO), antimony-doped tin oxide (ATO), aluminum-doped zinc oxide (AZO), gallium-doped zinc oxide (GZO), indium-doped zinc oxide (IZO), and a combination thereof. In some embodiments, the polymer is selected from the group consisting of polyethylene terephthalate (PET), polyethylene naphthalate (PEN), polyimide (PI), and a combination thereof. In some embodiments, the conductive substrate of the first photoelectrode and the second photoelectrode comprises same conductive material. In some embodiments, the conductive substrate of the first photoelectrode and the second photoelectrode each, independently, comprises indium tin oxide.

Photoactive material for the biosensor described herein can be any suitable photoactive material known in the art. In some embodiments, the photoactive material comprises thin film, photoactive particle, nanoparticle, microparticle, nanomaterial, nanowire, nanorods, nanostar, semiconductor material, metal, metal oxide, sulfide, metal chalcogenide, carbon-based material, conductive polymer, photoactive polymer, plasmonic material, dye, or a combination thereof. In some embodiments, the photoactive material of the first photoelectrode and the second photoelectrode comprises same photoactive material. In some embodiments, the photoactive material of the first photoelectrode and the second photoelectrode each, independently, comprises photoactive particles, nanomaterial, or a combination thereof. In some embodiments, the photoactive material of the first photoelectrode and the second photoelectrode each, independently, comprises thin films, nanoparticles, microparticles, nanomaterial, or a combination thereof. In some embodiments, the photoactive material of the first photoelectrode and the second photoelectrode each, independently, comprises nanoparticles, microparticles, nanowires, nanorods, nanostars, or a combination thereof.

In some embodiments, the photoactive material of the first photoelectrode and the second photoelectrode each, independently, comprises conductor and/or semiconductor materials. In some embodiments, the photoactive material of the first photoelectrode and the second photoelectrode each, independently, comprises metal(s), metal oxide(s), semiconductor material(s), carbon-based material(s), conductive polymer(s), photoactive polymer(s), plasmonic material(s), dye(s), or a combination thereof. In some embodiments, the photoactive material of the first photoelectrode and the second photoelectrode each, independently, comprises metal oxide(s), sulfide(s), metal chalcogenide, or a combination thereof. In some embodiments, the metal oxide(s) are selected from the group consisting of Cd, Zn, In, Pb, Mo, W, Sb, Bi, Cu, Hg, Ti, Ag, Mn, Fe, V, Sn, Zr, Sr, Ga, Si, Cr, a perovskite such as SrTiO3 or CaTiO3, and a combination thereof. In some embodiments, the metal chalcogenide is selected from the group consisting of CdSe, In2Se3, WSe2, HgS, PbSe, CdTe, and a combination thereof. In some embodiments, the photoactive material of the first photoelectrode and the second photoelectrode each, independently, comprises titanium dioxide, zinc oxide, iron oxide, cadmium sulfide, cadmium telluride, or a combination thereof. In some embodiments, the photoactive material of the first photoelectrode and the second photoelectrode comprise the same metal oxide. In some embodiments, the photoactive material of the first photoelectrode and the second photoelectrode each, independently, comprises titanium dioxide. In some embodiments, the titanium dioxide has a crystal structure that is at least one of anatase, rutile and brookite. In some embodiments, the titanium dioxide is $P25\text{-}TiO_2$.

In some embodiments, the biosensor is comprised in a device. In some embodiments, the biosensor or device combines two electrodes fabricated from the same conductive substrates, such as ITO and both the electrodes have the same photoactive material, for example titanium dioxide ($TiO_2$). In some embodiments, the only difference in the two electrodes is two different lengths of capture DNA. In some embodiments, one photoelectrode works as signal-on mode and the other photoelectrode is signal-off.

Detectable label for the biosensor described herein can be any suitable detectable label known in the art that is compatible with the material of a photoelectrode in generating a detection signal. In some embodiments, the detectable label comprises a plasmonic nanoparticle, organic dye, light absorbing molecule, semiconductive nanoparticle, a carbon-based nanomaterial, metal semiconductive quantum dot, or organic semiconductor. In some embodiments, the detectable label comprises a plasmonic nanoparticle, organic dye, light absorbing molecule, semiconductive nanoparticle, or a carbon-based nanomaterial. In some embodiments, the detectable label comprises a metal, semiconductive quantum dot or organic semiconductor. In some embodiments, the detectable label comprises a gold nanoparticle. In some embodiments, the photoactive material comprises titanium dioxide and the detectable label comprises a gold nanoparticle.

In some embodiments, the biosensor uses a single material system by programming the response of the signal transduction channels to work in signal-on or signal-off modes.

The present disclosure also provides a sensitive method for detecting a target analyte in a sample. Accordingly, also provided is a method of detecting a target analyte in a sample, the method comprising:

contacting the sample with a biosensor described herein under conditions for
i) binding the target analyte to the first capture probe and the second capture probe, and binding the target analyte to the reporter moiety,
ii) binding the target analyte to the reporter moiety, or
iii) binding the target analyte to the first capture probe and the second capture probe, measuring a detection signal from each of the first electrode and the second photoelectrode, whereby in a) i) upon binding the target analyte to the reporter moiety and to the first capture probe, a detection signal is generated by transfer of electrons between the detectable label and the photoactive material on the first photoelectrode, and upon binding the target analyte to the reporter moiety and the second capture probe, a detection signal is generated by transfer of electrons between the detectable label and the photoactive material on the second photoelectrode, wherein the target analyte is a nucleic acid, wherein the first capture probe is capable of binding to a portion of the target analyte by complementarity, the second capture probe is capable of binding to a portion the target analyte by complementarity, and the reporter moiety is capable of binding to a portion of the target analyte by complementarity, and wherein the portion of the target analyte that can bind to the first capture probe or the second capture probe is a different portion than can bind to the reporter moiety, or in a) ii) upon binding the target analyte to the reporter moiety, the reporter moiety is activated and a fragment of the reporter moiety comprising the detectable label is released, and the released fragment then binds to the first capture probe and the second capture probe, or in a) iii) upon binding the target analyte to the first capture probe comprising a first reporter moiety, the first reporter moiety comprising the detectable label is retained in the first capture probe, and upon binding of the target analyte to the second capture probe comprising a second reporter moiety, the second reporter moiety comprising the detectable label is released from the second capture probe, wherein a higher intensity of the detection signal from the first photoelectrode as compared to the second photoelectrode in the presence of the sample, or a higher increase in the intensity of the detection signal from the first photoelectrode as compared to the second photoelectrode in the presence of the sample as compared to in the absence of the sample, is indicative of the presence of the target analyte.

In some embodiments, the method comprises in a mixing a detectable label, a reporter moiety comprising a detectable label, or a capture probe comprising a reporter moiety comprising a detectable label with a sample suspected of comprising a target analyte. In some embodiments, the detection signal is a change in photoelectrochemical current. Differential signal changes are calculated by adding the magnitude of detection signal changes. In some embodiments, the method further comprises calculating a difference and/or ratio between the detectable signal from the first photoelectrode and the second photoelectrode. In some embodiments, an increase in the signal from the first electrode and a decrease in the signal from the second electrode indicates presence of the target analyte in the sample.

Also provided herein is a method of detecting a target analyte in a sample, the method comprising optionally mixing a detectable label with a sample suspected of comprising the target analyte, contacting the sample with the biosensor described herein under conditions for binding the target analyte and/or the reporter moiety to the first capture probe and the second capture probe, and measuring a detectable signal from each of the first electrode and the second photoelectrode.

In some embodiments, the detectable signal measured in the method is a change in photoelectrochemical current. In some embodiments, the method further comprises calculating a difference and/or ratio between the detectable signal from the first photoelectrode and the second photoelectrode. In some embodiments, an increase in the signal from the first electrode and a decrease in the signal from the second electrode indicates presence of the target analyte in the sample.

A device, or kit for detecting a target analyte in a sample, comprising the biosensor described herein and/or components for the method described herein, and instructions for use are also provided. In some embodiments, the biosensor, device or kit is used for or the method is practiced in clinical and agricultural diagnostics, agri-food quality control, environmental monitoring, health screening, health monitoring, and/or pharmaceutical development. In some embodiments, the biosensor, device or kit and/or method of detection described herein can be used for detecting any suitable analyte, such as, and without being limited thereto, a wide range of small molecule, protein and nucleic acid analytes, including infection-causing pathogens in point-of-care testing for screening, diagnostics and/or health monitoring. In some embodiments, the kit further comprises a buffer, a sample collector, and/or gloves. Accordingly, also provided is use of the biosensor, device and/or kit as described herein to determine the presence of an analyte in a sample.

EXAMPLES

The following non-limiting Examples are illustrative of the present disclosure:

Example 1. Detection of Nucleic Acid Targets

Materials and Methods

Chemicals: Phosphate buffer solution (PBS, 1.0M, pH 7.4), L-ascorbic acid (99%), sodium chloride (NaCl), chitosan (CHIT, from shrimp, degree of deacetylation of 85%, Mw=200,000),), glacial acetic acid, 3,4-dihydroxybenzlaldehyde (DHB), poly(diallydimethylammonium chloride) (PDDA) and tris (2-carboxyethyl) phosphine hydrochloride (TCEP, 98%) were purchased from Sigma-Aldrich. P25-TiO$_2$ was obtained from Nippon aerosol Co. Ltd. Acetone and ethanol were purchased from commercial alcohols (Brampton, ON). Milli-Q grade (18.2 MΩ cm) de-ionized (DI) water was used for all solution preparation and washing steps.

TiO$_2$ substrate preparation: Fisherband premium plain glass microscope slides were used for substrate preparation. The glass slides were cut into desired dimensions and sonicated using acetone, ethanol and DI water for 15 minutes before using. A 100 nm film of indium tin oxide (ITO) was sputtered onto glass slides using a radio-frequency magnetron sputtering from angstrom science. A 90% In$_2$O$_3$ and 10% Sn$_2$O$_3$ target was used for the sputtering under the argon gas. All glass/ITO substrates were masked using vinyl tape to preserve electrode contact area and oxygen plasma treated for one minute. All films were fabricated by dropping 10 microliters of solution onto exposed glass/ITO substrate surface and baked at 100° C. for 5 minutes. This procedure was repeated for a total of three deposition steps. The resulting electrodes were then air dried and washed prior to use.

Surface modified TiO$_2$ and Au NP preparation: A 3 gL$^{-1}$ CHIT solution was prepared in DI water using 1% acetic acid. The concentration of DHB aqueous solution was 16 gL$^{-1}$. DHB-modified CHIT solution was obtained by modifying CHIT in the liquid phase. DHB modified CHIT solution (mass ratio 4:1 as DHB: CHIT) was prepared by adding DHB solution to the CHIT solution. P25-TiO$_2$ was added to the DHB-modified CHIT solution. Au NPs were prepared using previously reported synthesis protocols known in the literature and were kept refrigerated at 4° C. for storage. Briefly, a 1 mM gold chloride (HAuCl$_4$) solution was added into 38.8 mM trisodium citrate solution with a volume ratio of 10:1. This solution was boiled with vigorous stirring for 10 min, and then the stirring was continued for an additional 15 min without applying heat. This synthesis protocol produced the Au NPs with size approximately 12 nm. The size of the Au NPs were further confirmed by imaging in TEM.

Au NP-DNA conjugation: DNA conjugated Au NPs were prepared according to protocols known in the literature. Briefly, 1 ml of Au NPs were suspended in 10 mM PBS buffer (pH 7.0). 100 µM of thiolated DNA was reduced using TCEP and 35 µl of the reduced DNA was added to the Au NP solution. The solution was incubated for 16 h at room temperature (RT). After that, 10 mM PBS and 2 M NaCl solutions were added slowly to make the final salt concentration of 0.1 M NaCl. This solution was incubated for 40 hours at room temperature. Finally, the solution was washed three times and re-suspended in 10 mM PBS with 0.1 M NaCl buffer (pH 7.0).

Photoelectrochemical characterization: PEC measurements were carried out in a three-electrode cell setup with an ultraviolet flashlight to facilitate illumination of the photoelectrode surface. A Pt wire was used as the counter electrode, Ag/AgCl as the reference electrode, and the glass/ITO/TiO$_2$NP substrates acting as the working electrode. A 0.1 M PBS solution with 0.1 M ascorbic acid (AA) was used as the supporting electrolyte. The amperometric i-t curve were measured by a CHI 660D electrochemical station, under UV illumination at every 20 s for a period of 100 s. Photocurrents were reported as the difference in current with and without incident light on the face of the TiO$_2$ electrode.

The IPCE measurements were carried out in a three-electrode cell setup with Pt as the counter electrode, Ag/AgCl as the reference electrode, and a solution of 0.1 M AA in 0.1 M PBS as the electrolyte. All IPCE measurements were performed under a bias voltage of 0 V versus Ag/AgCl and light illumination in the range of 350-650 nm using a Zahner CIMPS-QE/IPCE Photo-Electrochemical workstation. IPCE is defined as:

$$IPCE(\%) = \frac{1240 \times I(A/cm^2)}{\lambda(nm) \times P_{inc}(W/cm^2)} \times 100 \tag{1}$$

where, I is the photocurrent, λ is the incident wavelength and P$_{inc}$ is the incident optical power of the excitation light[71].

Electron microscopy: The surface structure of the prepared substrate was analyzed using FEI Magellan 400 scanning electron microscope (SEM). UV-Visible (UV-VIS) absorption spectroscopy was measured using Infinite M200 pro (Tecan) plate reader.

X-ray Photoelectron Spectroscopy: XPS measurements were performed using the Kratos AXIS supra X-ray photoelectronspectrometer. The survey scan analysis was carried out over an area of 300×700 μm using a pass energy of 160 eV.

Mott-Schottky measurements: Mott-Schottky experiments were performed in a three-electrode setup using Ag/AgCl as a reference electrode and Pt as counter electrode. The electrolyte contained 2 mM potassium ferro/ferricyanide in 0.1 M KCl and 10 mM PBS. The experiments were performed with an AC excitation of 5 mV. From the Mott-Schottky plot, flat-band potential and charge carrier density were calculated by using the following formula:

$$\frac{1}{C^2} = \frac{2}{\varepsilon\varepsilon_0 A^2 e N_D}(V - V_{fb}) \quad (2)$$

where, $\varepsilon$ and $\varepsilon_0$ are the dielectric constant of the semiconductor and vacuum permittivity, respectively. $N_D$ is the charge carrier density, $V_{fb}$, is the flat band potential, C is capacitance and A is the area of the electrode.

Electrochemical impedance spectroscopy (EIS): EIS measurements were carried out using the Zahner potentiostat at RT by using the same electrolyte as Mott-Schottky measurements. All measurements were conducted at the open-circuit potential and within the frequency range of 100 kHz to 0.1 Hz.

DNA hybridization experiments: Electrodes were fabricated using a layer-by-layer drop casting method, followed by ssDNA (1 μM) probe deposition for 3 hours and incubation with a blank solution containing 1.2 nM of non-complementary target or complementary targets (100 aM to 1 nM) spiked in the blank solution. Electrodes were washed thoroughly between each deposition step. The measured percentage change in signal for each concentration is calculated as:

$$\Delta I = I_{Target} - I_{Probe} \quad (3)$$

$$\% \Delta I_{15\text{-}mer} = (\Delta I_{15\text{-}mer} \times 100)/I_{Probe\ 15\text{-}mer} \quad (4)$$

$$\% \Delta I_{20\text{-}mer} = (\Delta I_{20\text{-}mer} \times 100)/I_{Probe\ 20\text{-}mer} \quad (5)$$

$$\% \Delta I_{15\text{-}mer} = (\Delta I_{15\text{-}mer} \times 100)/I_{Probe\ 15\text{-}mer} \quad (6)$$

$$\% \Delta I = |\% \Delta I_{15\text{-}mer}| + |\% \Delta I_{20\text{-}mer}| \quad (7)$$

$I_{15\text{-}mer}$ indicates the percentage change in photocurrent following hybridization of Au NP-labelled target with the 15-mer probe, while $I_{20\text{-}mer}$ indicates the percentage change in photocurrent following hybridization of Au NP-labelled target with the 20-mer probe.

The DNA sequences used in this work are as follows (SH denotes thiolated):
15-mer probe: 5'-NH$_2$-AGG GAG ATC GTA AGC-3' (SEQ ID NO. 1);
20-mer probe: 5'-NH$_2$-AGG GAG ATC GTA AGC AAA AA-3' (SEQ ID NO. 2)
Complementary 25-mer target: 5'-SH-TTT TTT TTT TGC TTA CGA TCT CCC T-3' (SEQ ID NO. 3);
Non-Complementary 25-mer target: 5'-SH-TTT TTT TTT TTT TTT TTT TTT T-3' (SEQ ID NO. 4);
Complementary 34-mer target: 5'-SH-T TTT TTT TTT TTT TTT TTT GCT TAC GAT CTC CCT-3' (SEQ ID NO. 5);
Target sequence for the hybridized Au NP to be in proximity of TiO$_2$: 5'-TGC TTA CGA TCT CCC TTT TTT TTT T-SH-3' (SEQ ID NO. 6)

Limit-of-Detection: To calculate the limit-of-detection of the differential assay, the photocurrent change versus the log of target concentration in the linear range (10 aM-100 fM) was plotted. The limit-of-detection is determined by calculating the concentration where the y-value of the regression line becomes equal to the limit-of-blank (LOB). LOB is defined as:

$$LOB = \Delta I_{blank} + 1.96 \times \sigma_{blank}$$

where, $\sigma_{blank}$ is the standard deviation of the blank signal and the factor 1.96 is used to calculate the limit-of-detection within a 95% confidence interval.

Direct deposition of Au NPs on TiO$_2$ electrodes: In order to directly deposit Au NPs on TiO$_2$ electrodes, 10 μL of 2% PDDA solution was drop-deposited on the electrodes at RT. After 10 min, the electrodes were washed thoroughly using DI water to remove the PDDA that was not covalently attached. PDDA provides positive surface charge on the electrodes. After washing the electrodes, 30 μL of citrate-capped Au NPs were deposited and kept for 10 min. As the Au NPs have negative surface charge, it will be attached to the TiO$_2$ particles using electrostatic attraction.

Results and Discussion

Figure 1A:
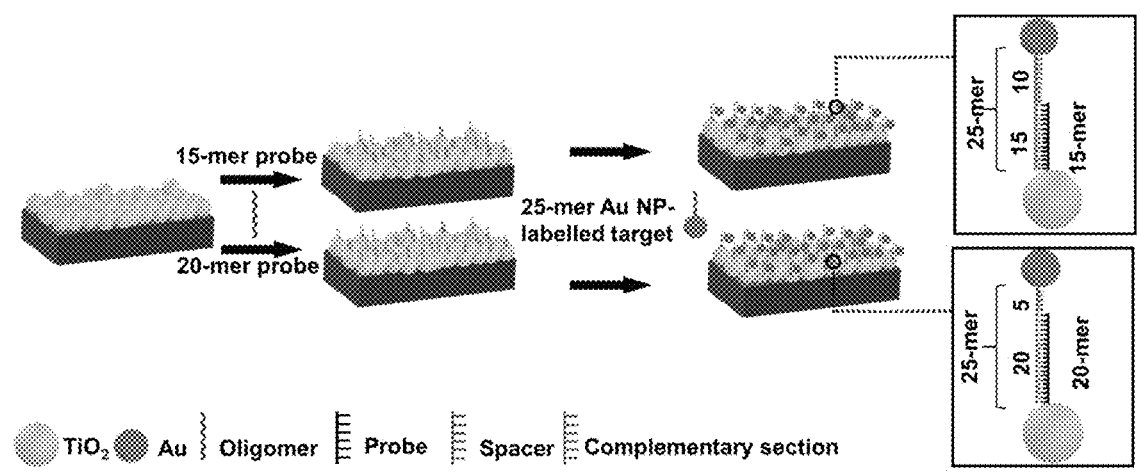
FIG. 1A shows the differential photoelectrochemical biosensor in exemplary embodiments of the disclosure.
Figure 1B:
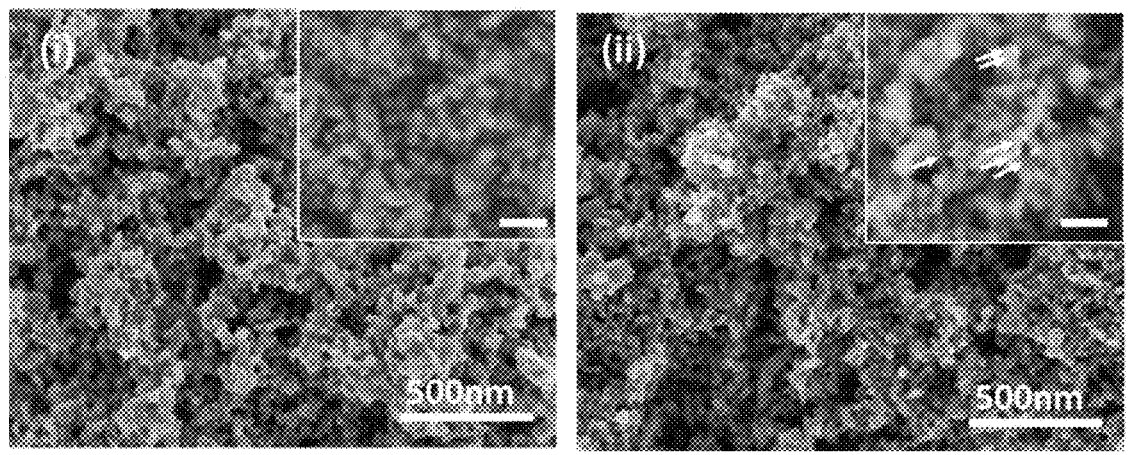
FIG. 1B shows the differential photoelectrochemical biosensor in exemplary embodiments of the disclosure.

To assess the role of DNA probes as nano-spacers for tuning the sensing response of different channels, two classes of biofunctionalized photoactive electrodes were created (FIG. 1A). Both of these photoactive electrodes were created from a porous network of TiO$_2$ NPs deposited on indium tin oxide (ITO) substrates (FIG. 1B, see image (i)). However, one was biofunctionalized with single-stranded DNA (ss-DNA) probes having 15 nucleotides (15-mer), and the other harbored a 20 nucleotide (20-mer) long ssDNA probe. Upon hybridization with Au NP-labelled complementary DNA targets (25-mer), these two classes of photoactive electrodes were expected to experience different Au—TiO$_2$ NP collision probabilities caused by the differences in the DNA motional dynamics. High magnification backscattered electron microscopy demonstrates that Au NPs are indeed introduced to the TiO$_2$ NP matrix by complementary DNA target strands following hybridization (FIG. 1B). As a result, a fraction of the TiO$_2$ NPs is expected to experience nanoscale interactions with Au NPs.

The incident photon to current conversion efficiency (IPCE) spectrum, which is defined as the number of electrons collected by the electrode per incident photon, was measured to evaluate the wavelength dependence of the PEC response for the 15-mer and 20-mer channels (FIG. 2A). On the 15-mer channel, the IPCE increases after hybridization with the complementary target, whereas for the 20-mer channel, the IPCE decreases. The increase or decrease in the IPCE after target hybridization is observed over the entire absorption spectrum of the photoelectrodes (from 350 nm to 550 nm). It should be noted that absorption of photons with energy lower than the bandgap of TiO$_2$ NPs (3.09 eV/400 nm as determined from FIG. 3 using the Kubelka-Munk (K-M or F(R)) method for the bandgap estimation) is achieved using these photoelectrodes because of the use of chitosan and 3,4-Dihydroxybenzaldehyde (DHB) in preparing nanoporous photoactive films (FIG. 2A; see inset).[1]

In addition to the IPCE measurements, the sensing capability of the system was evaluated using PEC readout (FIG. 2B). The system was optically excited using a single light source that operated at a wavelength range at which a large signal change was observed in the IPCE spectrum (FIG. 4 and FIG. 5). Ascorbic acid (AA) was used as the hole scavenger to generate a photocurrent upon optically exciting the $TiO_2$ photoelectrode. In both channels, an anodic current is generated, which was decreased upon functionalization with probe DNA. The anodic current is generated due to the annihilation of the photo-generated holes in $TiO_2$ by AA, and the movement of electrons from the conduction band of $TiO_2$ to the ITO electrode. Modifying the electrode surface with biorecognition elements decreases the PEC signal by hindering the access of AA to the electrode surface.

As hinted by the IPCE results, differences were observed in the signal change when the 15-mer and 20-mer channels were hybridized with complementary 25-mer DNA targets. The 15-mer channel demonstrated a signal increase (~177%), whereas the 20-mer channel yielded a signal decrease (~48%). It should be noted that incubating the probe-modified electrodes with non-complementary target produced a small signal decrease (~2%) in both channels (FIG. 2B and FIG. 2C), demonstrating the specificity of this readout strategy and its applicability to biosensing. The incubation of the probe modified electrodes with NC DNA strands served as a control experiment to examine the effect of nontargeted Au NP-labelled DNA sequences on the generated PEC signal.

X-ray photoelectron spectroscopy (XPS) analysis of both channels showed gold to be present at the electrode surface at 0.2 at. % (FIG. 6). Although this does not directly measure the amount of the Au NPs present at each channel, it provides a representative snapshot of the amount of gold at the electrode surface, showing that the Au NP amounts are similar in both channels. This indicates that the observed differences in the signal change on the 15-mer and 20-mer channels are not because of the difference in the surface concentration of Au NPs on these two channels.

The signal-on versus the signal-off response observed on the 15-mer and 20-mer channels, respectively, can be related to the different separations and collision probabilities experienced between the Au NPs and $TiO_2$ matrix on the two channels. In the electrode architecture described herein, following hybridization, the 15-mer channel holds a 15 nucleotide double-stranded segment with an estimated length of 5 nm and a 10 nucleotide single-stranded segment with a length of 3.33 nm (FIG. 1A). On the 20-mer channel, the 20 nucleotide double-stranded segment is estimated to be 6.67 nm in length, and the 5 nucleotide segment is estimated to be 1.66 nm in length (FIG. 1A). Double-stranded DNA (dsDNA) is considered to be significantly more rigid than ss-DNA having the same number of nucleotides. Therefore, because a larger portion of the DNA nano-spacer is single-stranded for the 15-mer channel compared to the 20-mer channel, there is a smaller average separation between the Au NP and $TiO_2$ surface.

Previous voltammetric studies performed using redox labelled-DNA constructs anchored on the electrode surface using a six-carbon ($C_6$) linker indicate that the rotational motion of double-stranded DNA (dsDNA) around the surface anchoring point allows the redox label to sufficiently approach the electrode for successful electron transfer. Additionally, the probability of electron transfer is influenced by the length of the linker that connects the redox label to the DNA strand, with longer linkers resulting in increased electron transfer. This system can be envisioned as a double hinged system with a spring-like anchor ($C_6$ linker, Hinge 1), rigid rod-like structure (dsDNA), and a flexible signaling linker connecting the DNA to the label (Hinge 2). Given that this system uses a $C_6$ linker, includes a double-stranded segment, and is terminated by a ssDNA segment conjugated with a Au NP, it can be modelled using the abovementioned double-hinged system (FIG. 7A). For the 15-mer channel, the single-stranded portion of the target DNA is 40% of the total nominal DNA length; whereas for the 20-mer channel, the single-stranded portion constitutes only 20% of the total nominal construct length. This indicates that the 20-mer channel includes a longer rod-like segment and a shorter flexible portion, which will have a dual effect on the probability of charge transfer between the Au NP and the $TiO_2$ matrix. The longer rod-like segment increases the bending radius of the DNA construct, and the shorter flexible segment decreases the probability of Au NP/electrode collisions. This dual effect is expected to result in a smaller probability of charge transfer between the Au NP and the $TiO_2$ matrix for the 20-mer channel in comparison with the 15-mer channel.

In order to calculate the relative collision rate of Au NPs with $TiO_2$, conformational analysis of the DNA nano-spacers on the 15-mer and 20-mer channels was performed considering the worm-like chain model. The DNA nano-spacers on each channel were modeled by considering each nano-spacer as two separate DNA segments (ssDNA and dsDNA) with different persistence lengths (FIG. 8), 45-55 nm for dsDNA ( )3 and 2 nm for ssDNA. Although this model considers probe DNA to be anchored on a planar substrate, it is expected to provide an estimate of the relative collision rate for the rough surface used herein because of the stochastic motions of the DNA strands. This model indicates that a 5.77-5.83 times higher collision rate is expected on the 15-mer channel compared to the 20-mer channel.

The experimental results demonstrate that signal enhancement occurs on the 15-mer channel, while signal decrease is seen on the 20-mer channel. On average, a larger number of Au NPs directly contact the $TiO_2$ surface more often on the 15-mer channel than on the 20-mer channel. This difference in signal generation by the two channels is evident, despite the uneven surface of the $TiO_2$ electrodes because the measured current is a collection of the aggregated response of all the NPs present at the electrode surface.

Whether direct contact between Au NPs and $TiO_2$ electrodes would result in an enhancement in photocurrent, similar to what was observed on the 15-mer channel, was further explored. An experiment was designed in which Au NPs were deposited directly on the $TiO_2$ electrodes by using electrostatic attraction. Au NPs directly deposited on $TiO_2$ electrodes showed a higher photocurrent compared to bare $TiO_2$ electrodes (FIG. 9). Additionally, the IPCE spectrum (FIG. 9) obtained on bare and Au NP-modified $TiO_2$ electrodes showed a similar behavior to that observed on the 15-mer channel, further corroborating that direct Au NP—$TiO_2$ contact could be responsible for the photocurrent enhancement seen on this channel.

Previous studies have demonstrated that Au NPs in direct contact with TiO2 substrates alter the carrier lifetime measured on the $TiO_2$ surfaces because of the increased recombination probability. The changes in carrier lifetime were measured by performing electrochemical impedance spectroscopy (EIS) on the two channels before and after hybridization. The phase diagram of EIS shows a positive phase shift after hybridization which delineates a decrease in carrier lifetime on the 15-mer channel, whereas no significant shift is observed for the 20-mer channel (FIG. 10). For probe-modified substrate, carrier lifetime is 13.9 ms, whereas after target introduction carrier lifetime becomes 7.4 ms for the 15-mer channel and 13.6 ms for the 20-mer channel. Thus, reduction of the carrier lifetime between probe-modified and hybridized electrodes is calculated as 46.8 and 2.1% for the 15-mer and 20-mer channels, respectively. The change in carrier lifetime shows that Au NPs are directly contacting the $TiO_2$ NPs on the 15-mer channel, which is not observed on the 20-mer channel. This is in line the Au NPs on the 15-mer channel have a higher chance of collision with the $TiO_2$ NPs compared to the 20-mer channel.

To understand the link between the changes in the DNA motional dynamics and the PEC response of the two channels, the possible mechanisms for signal generation were considered. Upon optical excitation of this Au—$TiO_2$ NP complex, electron/holes pairs are generated at the surface of $TiO_2$ NPs and interband carriers are generated in Au NPs[2,3] as the d-band energy lies only 2.4 eV below the Fermi levels of Au (FIG. 7B). When Au NPs are in proximity or contact to the surface of a semiconductor, it is possible to induce multiple effects on the photocurrent of the semiconductor,[4,5] including catalysis, surface passivation, Femi-level equilibration/photocharging, incident energy absorption, plasmonic-enhancement (e.g. light scattering, hot electron injection, enhanced semiconductor absorption because of local electric field enhancement, and plasmon-induced resonance energy transfer (PIRET)), and Förster resonance energy transfer (FRET).

Regarding the signal increase observed on the 15-mer channel and noting that catalysis is insignificant in this electrolyte system, Fermi-level equilibration/photocharging, light scattering, plasmonic hot electron injection, and PIRET were considered. Since the Au NPs are 12 nm in size (FIG. 11), plasmonic light scattering is negligible. Enhancement of the local electric field at the surface of Au NPs through localized surface plasmon resonance can enhance the photocurrent induced in $TiO_2$ NPs through radiative and nonradiative (PIRET) mechanisms. Radiative energy transfer from metal NPs to the semiconductor enhances absorption cross-section by enhancing electron-hole pair generation in the semiconductor. However, for smaller Au NPs (diameter <30 nm) such as those used herein, the efficiency of radiative energy transfer drops significantly, making it an unlikely enhancement mechanism. PIRET is the nonradiative energy transfer process that can increase the electron-hole pair in $TiO_2$ NPs. PIRET occurs as a result of dipole-dipole coupling between the plasmon of the metal NP and the electron-hole pairs in the semiconductor because of the spectral overlap of the plasmonic resonance band of the metal NP and the absorption band of the semiconductor. Cushing et al. performed an experiment using transient absorption spectroscopy to investigate whether charge transfer or PIRET is the dominant mechanism for photoconversion efficiency enhancement in the metal NP-semiconductor heterojunctions.[6] It was shown that there is no detectable PIRET effect for the wavelength range of 350-750 nm when Au NP is in contact or proximity with $TiO_2$. PIRET requires strong dipole generation in a metal, which occurs by exciting plasmons. From the absorption spectra of Au NPs (FIG. 2A; see inset), it can be seen that the significant plasmon excitation occurs in the range of 515-525 nm. Since the UV excitation used herein (395 nm) does not include the plasmonic band of Au NPs (in the range of 515-525 nm), PIRET mechanism can be excluded for the photocurrent enhancement seen in 15-mer channel. In addition, the lack of spectral overlap between the Au NPs and $TiO_2$ (FIG. 2A; see inset) allow for exclusion of PIRET. Although the material architecture presented herein is not identical to that used in Cushing's work, in both cases, the $TiO_2$ shows an absorption tail at 395 nm (the excitation wavelength used herein) and the plasmonic excitation of the gold falls within the 515-530 nm range.

Consequently, plasmonic hot electron transfer and Fermi-level equilibration/photocharging are potential mechanisms for signal enhancement, suggesting that the 15-mer/25-mer DNA construct enables direct charge transfer to occur between the Au NPs and $TiO_2$ matrix. A large shift in the flat band potential (~140 mV) observed in the 15-mer channel after target hybridization (FIG. 7C) compared to the much smaller shift in the 20-mer channel confirms that there is a larger probability for direct charge transfer in the 15-mer compared to the 20-mer case. This potential shift was not evident when unlabeled target DNA was used (FIG. 12), indicating the importance of the interaction between Au and $TiO_2$ NPs. The shift in flat band potential has been previously observed in Au NP-modified semiconductors and is attributed to Fermi level equilibration,[7,8] which occurs because of the metal deposition at the semiconductor electrode (FIG. 7B) and the direct charge transfer from the semiconductor to the metal.

Photocharging occurs when light-induced electrons move from the semiconductor conduction band to the surface of Au NPs, and is a special case of Fermi level equilibration under light excitation. This directional electron movement occurs if the Fermi energy of Au NPs lies below the conduction band energy of $TiO_2$,[8] which is the case herein (FIG. 7B). Au NPs have been widely reported to exhibit this electron-sink (photocharging) effect and can minimize charge recombination owing to enhanced charge separation (FIG. 13).[10-12] UV excitation generates electron-hole ($e^-$-$h^+$) pairs in the $TiO_2$. The Au NPs act as an electron sink thereby allowing the conduction band electrons ($e^-$) to move from the $TiO_2$ to the Au NP, thus enhancing electron-hole separation. This in turn, increases the charge carrier lifetime and consequently the photocurrent This enhanced charge separation is supported by the increased carrier density observed from the slope of the Mott-Schottky curve measured after hybridization on the 15-mer channel (FIG. 7C, FIG. 12, and Table 1).

TABLE 1

Flat-band potential ($V_{fb}$) and charge carrier density ($N_D$) for 15-mer and 20-mer channels.

| Material-architecture | $V_{fb\text{-}probe}$ (mV) | $V_{fb\text{-}target}$ (mV) | $N_{D\text{-}probe}$ (cm$^{-3}$) | $N_{D\text{-}target}$ (cm$^{-3}$) |
|---|---|---|---|---|
| 15-mer channel with AuNP labelled complementary target | −790 | −650 | $1.29 \times 10^{17}$ | $2.69 \times 10^{17}$ |
| 20-mer channel with AuNP-labelled complementary target | −785 | −760 | $1.28 \times 10^{17}$ | $1.43 \times 10^{17}$ |
| 15-mer channel with AuNP labelled non-complemetray target | −770 | −770 | $1.30 \times 10^{17}$ | $1.31 \times 10^{17}$ |

Hot electron injection or the direct transfer of excited charge carriers also explains the signal enhancement seen on the 15-mer channel, in which there is a large probability for direct electron transfer. Hot holes/electrons are generated by plasmon dephasing with the energetics of the hot carriers depending on the excitation energy (intraband/interband excitation).[13,14] The energy of the hot electrons is higher for intraband excitation; whereas hot holes are more energetic for interband excitation[13,15,16] that is used herein. Interband d-sp transitions in the Au NPs following UV excitation generate highly energetic hot holes and hot electrons that are capable of taking part in redox reactions.[17,18] For interband transitions, the energy of the hot holes can be as high as ($E_{F-Au}$–$hv_{excitation}$), whereas the energy of hot electrons lies near the Fermi level of Au, where $E_{F-Au}$ denotes the Fermi level of Au NPs and $v_{excitation}$ is the excitation wavelength. These hot holes generated at the surface of the Au NPs can directly oxidize AA in conjunction with the holes generated upon UV excitation of the underlying $TiO_2$ matrix. Interband hot electrons can also have sufficient energy to overcome the Schottky barrier at the Au—$TiO_2$ interface and therefore the electrons move from Au NPs to the $TiO_2$ matrix.[19] This phenomenon can also increase the anodic current generated and collected at the 15-mer channel.

Regarding the signal decrease observed on the 20-mer channel, the DNA motional dynamics is expected to lower the probability of direct charge transfer between the Au NPs and the $TiO_2$ matrix. Consequently, photocharging and plasmonic hot electron injection can be considered negligible. The 12 nm Au NPs can strongly absorb the incident light; however, the energy uptake by the Au NPs cannot transfer to $TiO_2$ due to the low probability of charge transfer. Therefore, these Au NPs partially block the incident light received by $TiO_2$, leading to the reduction of photocurrent in $TiO_2$. Moreover, DNA labelled Au-NPs are negatively charged and sterically and electrostatically hinder the access of AA to the electrode system, which reduces the electrochemical activity of the system.

To confirm that the change in photocurrent is driven by the probability of charge transfer between the Au NPs and $TiO_2$ matrix and is not sequence-specific, an experiment was designed where the longer probe sequence (20-mer) was hybridized with a longer Au NP-labelled target sequence (34-mer). In this case, the target/probe length ratio was kept the same as the 15-mer/25-mer channel. Similar to the 15-mer/25-mer complex, the 20-mer/34-mer DNA construct demonstrated a signal increase upon hybridization (FIG. 14), indicating the importance of the length ratio between the single-stranded and double-stranded segments of DNA complexes in controlling their interaction with the electrode surface. An enhancement in signal of 64% was seen for the complementary case while a decrease of 28% observed for the non-complementary case. In order to further verify that the signal-on and signal-off responses were related to the different collision probabilities experienced between the Au NPs and the $TiO_2$ matrix on the two channels, hybridization experiments with Au NPs attached to the proximal end of the target DNA were conducted. This was to test if a similar enhancement in photocurrent would be exhibited in both the 15-mer and 20-mer channels as the Au NPs, when positioned at the proximal end of the DNA target, since the Au NP is expected to directly contact the $TiO_2$ NP surface and have very similar interactions with the TiO2 NPs. As expected, PEC measurements (FIG. 15) revealed similar enhancements in photocurrent (~174.33 and ~172.38% on the 15-mer and 20-mer, respectively) on both channels, thereby confirming that the signal-on and signal-off responses were related to the different collision probabilities experienced between the Au NPs and the $TiO_2$ matrix on the two channels.

From this knowledge, an ultra-sensitive differential DNA biosensor was created. For this purpose, the 15-mer and 20-mer channels were integrated onto a single multiplexed substrate (FIG. 16A), allowing both channels to be interfaced with a single solution. As expected, when a heterogeneous solution containing both complementary and non-complementary DNA sequences was introduced to the device (target drop), the electrodes on the 15-mer channel showed a PEC current that monotonically increased with increasing concentration of complementary DNA, whereas the 20-mer channel demonstrated a monotonically decreasing current (FIG. 16A). The percentage change that was measured on each channel before and after the introduction of blank and target drops containing 100 aM-1 nM of complementary DNA suspended in the blank solution was then plotted (FIG. 16B). Additionally, the differential response of the device was plotted by adding the magnitude of changes obtained using the 20-mer and 15-mer channels. This differential processing increased the signal magnitude at every target concentration point. For example, a signal change of 186% for the 15-mer channel at 1 nM was increased to 227% upon differential processing. Moreover, this signaling strategy increased the sensitivity of the measurement from 14% per log for the 15-mer and 7% per log for the 20-mer to 23% per log for the differential approach (FIG. 17) resulting in a limit-of-detection of 800 aM. The linear regions of the calibration curve as shown in FIG. 17 were fitted using the following equations: (a) ΔI (%)=14.56 log C+0.98; correlation coefficient 95.2%, (b) ΔI (%)=7.78 log C+4.57; correlation coefficient=99.8%, whereas the linear equation for the limit-of-detection regression line is ΔI (%)=22.35 log C+5.55 with a correlation coefficient of 97.5% (FIG. 16B; see inset).

The combination of the signal-on and signal-off PEC channels on a single device to create a differential DNA biosensor, increased the device sensitivity by a factor of 1.5 or 3.2 compared to using only the 15-mer or 20-mer channels, respectively. The LOD of 800 aM, with a log linear dynamic range of three decades, is significantly enhanced compared to other semiconductive/plasmonic DNA biosensors using a single channel.[20-23]

The stability of both channels was evaluated by illuminating the electrodes after target recognition repeatedly for 15 cycles for a period of 600 s (FIG. 18). Through this repeated cycling, both of the 15-mer and 20-mer channels showed stable photocurrents with relative standard deviations of 1.35 and 1.29%, respectively.

The two-channel PEC sensor may be applied to the detection of unlabeled target nucleic acids by incorporating separate reporter moiety molecules in a sandwich assay (FIG. 20) or using DNAzymes (FIG. 19). In FIG. 19, the DNAzyme cleaves a substrate to release the reporter moiety upon target binding. The different capture probe on each channel then hybridizes to the released reporter moiety.

Given its performance and reliance on robust materials, this differential PEC readout strategy would be applicable to a wide range of electrochemical biosensors where enzymes and redox species are currently used as labels. Additionally, this programmable signaling approach can be applied to other photoelectrochemical/electrochemical devices that could benefit from smart and in situ switching.

Example 2. Detection of Non-Nucleic Acid Targets

The two-channel strategy may also be used with functional nucleic acids, such as DNAzymes (as depicted in FIG. 19) or aptamers, to fabricate a PEC sensor for the detection of proteins and other non-nucleic acid targets. As shown in FIG. 21, the photoactive working electrode is biofunctionalized with aptamers. On one channel, target capture results in a signal increase due to the resultant close spacing between AuNP and the photoactive electrode. On another channel, the photoelectrochemical signal is reduced by target capture as the AuNP tagged protector strand is removed from the electrode surface.

While the present disclosure has been described with reference to examples, it is to be understood that the scope of the claims should not be limited by the embodiments set forth in the examples, but should be given the broadest interpretation consistent with the description as a whole.

All publications, patents and patent applications are herein incorporated by reference in their entirety to the same extent as if each individual publication, patent or patent application was specifically and individually indicated to be incorporated by reference in its entirety. Where a term in the present disclosure is found to be defined differently in a document incorporated herein by reference, the definition provided herein is to serve as the definition for the term.

REFERENCES (1) Victorious, A.; Clifford, A.; Saha, S.; Zhitomirsky, I.; Soleymani, L. Integrating $TiO_2$ Nanoparticles within a Catecholic Polymeric Network Enhances the Photoelectrochemical Response of Biosensors. *J. Phys. Chem. C* 2019, 123 (26), 16186-16193.

(2) Pinchuk, A.; Plessen, G. von; Kreibig, U. Influence of Interband Electronic Transitions on the Optical Absorption in Metallic Nanoparticles. *J. Phys. D. Appl. Phys.* 2004, 37 (22), 3133-3139.

(3) Halawa, M. I.; Wu, F.; Nsabimana, A.; Lou, B.; Xu, G. Inositol Directed Facile "Green" Synthesis of Fluorescent Gold Nanoclusters as Selective and Sensitive Detecting Probes of Ferric Ions. *Sensors Actuators B Chem.* 2018, 257, 980-987.

(4) Li, J.; Cushing, S. K.; Chu, D.; Zheng, P.; Bright, J.; Castle, C.; Manivannan, A.; Wu, N. Distinguishing Surface Effects of Gold Nanoparticles from Plasmonic Effect on Photoelectrochemical Water Splitting by Hematite. *J. Mater. Res.* 2016, 31 (11), 1608-1615.

(5) Wu, N. Plasmonic Metal-Semiconductor Photocatalysts and Photoelectrochemical Cells: A Review. *Nanoscale* 2018, 10 (6), 2679-2696.

(6) Cushing, S. K.; Li, J.; Bright, J.; Yost, B. T.; Zheng, P.; Bristow, A. D.; Wu, N. Controlling Plasmon-Induced Resonance Energy Transfer and Hot Electron Injection Processes in Metal@TiO2 Core-Shell Nanoparticles. *J. Phys. Chem. C* 2015, 119, 16239-16244.

(7) Meng, F.; Cushing, S. K.; Li, J.; Hao, S.; Wu, N. Enhancement of Solar Hydrogen Generation by Synergistic Interaction of $La_2Ti_2O_7$ Photocatalyst with Plasmonic Gold Nanoparticles and Reduced Graphene Oxide Nanosheets. *ACS Catal.* 2015, 5 (3), 1949-1955.

(8) Naphade, R. A.; Tathavadekar, M.; Jog, J. P.; Agarkar, S.; Ogale, S. Plasmonic Light Harvesting of Dye Sensitized Solar Cells by Au-Nanoparticle Loaded $TiO_2$ Nanofibers. *J. Mater. Chem. A* 2014, 2 (4), 975-984.

(9) Lim, S. P.; Pandikumar, A.; Huang, N. M.; Lim, H. N. Facile Synthesis of $Au@TiO_2$ Nanocomposite and Its Application as a Photoanode in Dye-Sensitized Solar Cells. *RSC Adv.* 2015, 5 (55), 44398-44407.

(10) Nbelayim, P.; Kawamura, G.; Kian Tan, W.; Muto, H.; Matsuda, A. Systematic Characterization of the Effect of $Ag@TiO_2$ Nanoparticles on the Performance of Plasmonic Dye-Sensitized Solar Cells. *Sci. Rep.* 2017, 7 (1), 15690.

(11) Lim, S. P.; Pandikumar, A.; Lim, H. N.; Ramaraj, R.; Huang, N. M. Boosting Photovoltaic Performance of Dye-Sensitized Solar Cells Using Silver Nanoparticle-Decorated N,S—Co-Doped-TiO2 Photoanode. *Sci. Rep.* 2015, 5, 11922.

(12) Wen, C.; Ishikawa, K.; Kishima, M.; Yamada, K. Effects of Silver Particles on the Photovoltaic Properties of Dye-Sensitized $TiO_2$ Thin Films. *Sol. Energy Mater. Sol. Cells* 2000, 61 (4), 339-351.

(13) Hartland, G. V; Besteiro, L. V; Johns, P.; Govorov, O. What's so Hot about Electrons in Metal Nanoparticles? *ACS Energy Lett.* 2017, 2 (7), 1641-1653.

(14) Govorov, A. O.; Zhang, H.; Gun'ko, Y. K. Theory of Photoinjection of Hot Plasmonic Carriers from Metal Nanostructures into Semiconductors and Surface Molecules. *J. Phys. Chem. C* 2013, 117 (32), 16616-16631.

(15) Besteiro, L. V.; Kong, X. T.; Wang, Z.; Hartland, G.; Govorov, O. Understanding Hot-Electron Generation and Plasmon Relaxation in Metal Nanocrystals: Quantum and Classical Mechanisms. *ACS Photonics* 2017, 4 (11), 2759-2781.

(16) Minutella, E.; Schulz, F.; Lange, H. Excitation-Dependence of Plasmon-Induced Hot Electrons in Gold Nanoparticles. *J. Phys. Chem. Lett.* 2017, 8 (19), 4925-4929.

(17) Zhao, J.; Nguyen, S. C.; Ye, R.; Ye, B.; Weller, H.; Somorjai, G. A.; Alivisatos, A. P.; Toste, F. D. A Comparison of Photocatalytic Activities of Gold Nanoparticles Following Plasmonic and Interband Excitation and a Strategy for Harnessing Interband Hot Carriers for Solution Phase Photocatalysis. *ACS Cent. Sci.* 2017, 3 (5), 482-488.

(18) Zhang, J.; Li, Z.; Zhang, J.; Guo, S.; Li, G.; Fang, Q. Efficient Base-Free Direct Oxidation of Glucose to Gluconic Acid over $TiO_2$-Supported Gold Clusters. *Nanoscale* 2018, 11, 1326-1334.

(19) Tian, Y.; Tatsuma, T. Mechanisms and Applications of Plasmon-Induced Charge Separation at $TiO_2$ Films Loaded with Gold Nanoparticles. *J. Am. Chem. Soc.* 2005, 127 (20), 7632-7637.

(20) Zhang, L.; Sun, Y.; Liang, Y.-Y.; He, J.-P.; Zhao, W.-W.; Xu, J.-J.; Chen, H.-Y. Ag Nanoclusters Could Efficiently Quench the Photoresponse of CdS Quantum Dots for Novel Energy Transfer-Based Photoelectrochemical Bioanalysis. *Biosens. Bioelectron.* 2016, 85, 930-934.

(21) Shu, J.; Qiu, Z.; Lv, S.; Zhang, K.; Tang, D. Plasmonic Enhancement Coupling with Defect-Engineered TiO2-x: A Mode for Sensitive Photoelectrochemical Biosensing. *Anal. Chem.* 2018, 90 (4), 2425-2429.

(22) Shi, X.-M.; Mei, L.-P.; Wang, Q.; Zhao, W.-W.; Xu, J.-J.; Chen, H.-Y. Energy Transfer between Semiconducting Polymer Dots and Gold Nanoparticles in a Photoelectrochemical System: A Case Application for Cathodic Bioanalysis. *Anal. Chem.* 2018, 90 (7), 4277-4281.

(23) Bettazzi, F.; Laschi, S.; Voccia, D.; Gellini, C.; Pietraperzia, G.; Falciola, L.; Pifferi, V.; Testolin, A.; Ingrosso, C.; Placido, T.; et al. Ascorbic Acid-Sensitized Au Nanorods-Functionalized Nanostructured TiO2 Transparent Electrodes for Photoelectrochemical Genosensing. *Electrochim. Acta* 2018, 276, 389-398.

The invention claimed is:

1. A biosensor for detecting a nucleic acid target analyte in a sample comprising:
   a) a first photoelectrode comprising a conductive substrate and a photoactive material;
   b) a second photoelectrode comprising a conductive substrate and a photoactive material;
   c) a first capture probe functionalized on the first photoelectrode;
   d) a second capture probe functionalized on the second photoelectrode; and
   e) one or more reporter moieties comprising a detectable label;
   wherein the first capture probe comprising a first nucleic acid and the second capture probe comprising a second nucleic acid each, independently, provides a distance between the detectable label and the photoactive material in the presence of the target analyte,
   wherein intensity of detection signal dictated by the distance is generated from the first photoelectrode and the second photoelectrode by transfer of electrons between the detectable label and the photoactive material,
   wherein a higher intensity of the detection signal from the first photoelectrode as compared to the second photoelectrode in the presence of the sample, or a higher increase in the intensity of the detection signal from the first photoelectrode as compared to the second photoelectrode in the presence of the sample as compared to in the absence of the sample, is indicative of the presence of the target analyte,
   wherein the detection signal is a change in photoelectrochemical current, voltage or impedance,
   wherein the photoactive material comprises titanium dioxide and the detectable label comprises a gold nanoparticle,
   wherein the titanium dioxide is a modified titanium dioxide modified by 3,4-dihydroxybenzaldehyde (DHB), and
   wherein the biosensor has a limit-of-detection of 800 aM target analyte concentration.

2. The biosensor of claim 1, wherein the first capture probe is capable of binding to a portion of the target analyte by complementarity, the second capture probe is capable of binding to a portion of the target analyte by complementarity, and the one or more reporter moieties is capable of binding to a portion of the target analyte by complementarity, and wherein the portion of the target analyte that can bind to the first capture probe or the second capture probe is a different from the portion that can bind to the one or more reporter moieties.

3. The biosensor of claim 1, wherein the one or more reporter moieties are capable of binding to and being activated by the target analyte, and wherein the activation of the one or more reporter moieties release a fragment comprising the detectable label whereby the fragment is capable of binding to the first capture probe and the second capture probe.

4. The biosensor of claim 1, wherein the first capture probe comprises a first reporter moiety and the second capture probe comprises a second reporter moiety, wherein the first capture probe is capable of binding to the target analyte and the second capture probe is capable of binding to the target analyte, wherein upon binding of the target analyte to the first capture probe, the first reporter moiety comprising the detectable label is retained in the first capture probe, and wherein upon binding of the target analyte to the second capture probe, the second reporter moiety comprising the detectable label is released from the second capture probe.

5. The biosensor of claim 1, wherein the detection signal is the change in photoelectrochemical current.

6. The biosensor of claim 1, wherein the first photoelectrode is configured to provide an increase in the intensity of the detection signal and the second photoelectrode is configured to provide a decrease in the intensity of the detection signal in the presence of the target analyte as compared to in the absence of the target analyte.

7. The biosensor of claim 1, wherein binding of the target analyte to the first capture probe brings the detectable label closer to the photoactive material of the first photoelectrode than binding of the target analyte to the second capture probe of the second photoelectrode in bringing the detectable label to the photoactive material of the second photoelectrode.

8. The biosensor of claim 1, wherein each of the first nucleic acid and the second nucleic acid is a single-stranded DNA, a DNAzyme, or an aptamer.

9. The biosensor of claim 1, wherein the target analyte is a nucleic acid, a carbohydrate, a lipid, a peptide, a protein, a small inorganic molecule, a small organic molecule, a metal ion, a, toxin, a cell, a tissue, a microorganism, or a virus.

10. The biosensor of claim 1, wherein the conductive substrate comprises a conductive material, and optionally a non-conductive material.

11. The biosensor of claim 10, wherein the conductive material is selected from the group consisting of indium tin oxide (ITO), fluorine-doped tin oxide (FTO), antimony-doped tin oxide (ATO), aluminum-doped zinc oxide (AZO), gallium-doped zinc oxide (GZO), indium-doped zinc oxide (IZO) and a combination thereof.

12. The biosensor of claim 10, wherein the conductive material comprises indium tin oxide.

13. The biosensor of claim 10, wherein the non-conductive material is glass or polymer.

14. The biosensor of claim 13, wherein the polymer is selected from the group consisting of polyethylene terephthalate (PET), polyethylene naphthalate (PEN), polyimide (PI), and a combination thereof.

15. A method of detecting a target analyte in a sample, the method comprising:
   a) contacting the sample with the biosensor of claim 1 under conditions for
      i) binding the target analyte to the first capture probe and the second capture probe, and binding the target analyte to the one or more reporter moieties,
      ii) binding the target analyte to the one or more reporter moieties, or
      iii) binding the target analyte to the first capture probe and the second capture probe,
   b) measuring a detection signal from each of the first photoelectrode and the second photoelectrode,
   whereby
   in a) i) upon binding the target analyte to the one or more reporter moieties and to the first capture probe, a detection signal is generated by transfer of electrons between the detectable label and the photoactive material on the first photoelectrode, and upon binding the target analyte to the one or more reporter moieties and the second capture probe, a detection signal is generated by transfer of electrons between the detectable label and the photoactive material on the second photoelectrode, wherein the first capture probe is capable of binding to a portion of the target analyte by complementarity, the second capture probe is capable of binding to a portion the target analyte by complementarity, and the one or more reporter moieties are capable of binding to a portion of the target analyte by complementarity, and wherein the portion of the target analyte that can bind to the first capture probe or the second capture probe is a different portion than can bind to the one or more reporter moieties, or in a) ii) upon binding the target analyte to the one or more reporter moieties, the one or more reporter moieties are activated and a fragment of the one or more reporter moieties comprising the detectable label is released, and the released fragment then binds to the first capture probe and the second capture probe, or in a) iii) upon binding the target analyte to the first capture probe comprising a first reporter moiety, the first reporter moiety comprising the detectable label is retained in the first capture probe, and upon binding of the target analyte to the second capture probe comprising a second reporter moiety, the second reporter moiety comprising the detectable label is released from the second capture probe, wherein a higher intensity of the detection signal from the first photoelectrode as compared to the second photoelectrode in the presence of the sample, or a higher increase in the intensity of the detection signal from the first photoelectrode as compared to the second photoelectrode in the presence of the sample as compared to in the absence of the sample, is indicative of the presence of the target analyte.

16. The method of claim 15, wherein the detection signal is the change in photoelectrochemical current.

* * * * *

UNITED STATES PATENT AND TRADEMARK OFFICE
CERTIFICATE OF CORRECTION

| | | |
|---|---|---|
| PATENT NO. | : 11,874,247 B2 | Page 1 of 1 |
| APPLICATION NO. | : 17/466354 | |
| DATED | : January 16, 2024 | |
| INVENTOR(S) | : Leyla Soleymani, Sudip Saha and Amanda Victorious | |

It is certified that error appears in the above-identified patent and that said Letters Patent is hereby corrected as shown below:

In the Claims

Claim 9, Column 34, Line 24, "metal ion, a, toxin, a cell, a tissue, a microorganism, or a" should read -- metal ion, a toxin, a cell, a tissue, a microorganism, or a --.

Signed and Sealed this
Twelfth Day of November, 2024

*Katherine Kelly Vidal*

Katherine Kelly Vidal
*Director of the United States Patent and Trademark Office*

SEQUENCE LISTING

<160> NUMBER OF SEQ ID NOS: 6

<210> SEQ ID NO 1
<211> LENGTH: 15
<212> TYPE: DNA
<213> ORGANISM: Artificial Sequence
<220> FEATURE:
<223> OTHER INFORMATION: Synthetic Construct

<400> SEQUENCE: 1
agggagatcg taagc                                                          15

<210> SEQ ID NO 2
<211> LENGTH: 20
<212> TYPE: DNA
<213> ORGANISM: Artificial Sequence
<220> FEATURE:
<223> OTHER INFORMATION: Synthetic Construct

<400> SEQUENCE: 2
agggagatcg taagcaaaaa                                                     20

<210> SEQ ID NO 3
<211> LENGTH: 25
<212> TYPE: DNA
<213> ORGANISM: Artificial Sequence
<220> FEATURE:
<223> OTHER INFORMATION: Synthetic Construct

<400> SEQUENCE: 3
tttttttttt gcttacgatc tccct                                               25

<210> SEQ ID NO 4
<211> LENGTH: 25
<212> TYPE: DNA
<213> ORGANISM: Artificial Sequence
<220> FEATURE:
<223> OTHER INFORMATION: Synthetic Construct

<400> SEQUENCE: 4
tttttttttt tttttttttt ttttt                                               25

<210> SEQ ID NO 5
<211> LENGTH: 34
<212> TYPE: DNA
<213> ORGANISM: Artificial Sequence
<220> FEATURE:
<223> OTHER INFORMATION: Synthetic Construct

<400> SEQUENCE: 5
tttttttttt tttttttttg cttacgatct ccct                                     34

<210> SEQ ID NO 6
<211> LENGTH: 25
<212> TYPE: DNA
<213> ORGANISM: Artificial Sequence
<220> FEATURE:
<223> OTHER INFORMATION: Synthetic Construct

<400> SEQUENCE: 6
tgcttacgat ctcccttttt ttttt                                               25